(12) United States Patent
Chen et al.

(10) Patent No.: US 8,488,259 B2
(45) Date of Patent: Jul. 16, 2013

(54) OPTICAL IMAGE CAPTURING LENS SYSTEM

(75) Inventors: Chun-Shan Chen, Taichung (TW); Hsiang-Chi Tang, Taichung (TW); Po-Lun Hsu, Taichung (TW); Dung-Yi Hsieh, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 71 days.

(21) Appl. No.: 13/339,698

(22) Filed: Dec. 29, 2011

(65) Prior Publication Data

US 2013/0021680 A1 Jan. 24, 2013

(30) Foreign Application Priority Data

Jul. 19, 2011 (TW) .............................. 100125487 A

(51) Int. Cl.
*G02B 3/02* (2006.01)
(52) U.S. Cl.
USPC .......................................... 359/764; 359/714
(58) Field of Classification Search
USPC ................................................ 359/714, 764
See application file for complete search history.

(56) References Cited

U.S. PATENT DOCUMENTS

| 7,365,920 B2 | 4/2008 | Noda |
| 2011/0115965 A1* | 5/2011 | Engelhardt et al. ........... 348/345 |

* cited by examiner

*Primary Examiner* — William Choi
(74) *Attorney, Agent, or Firm* — Morris Manning & Martin LLP; Tim Tingkang Xia, Esq.

(57) ABSTRACT

This invention provides an optical image capturing lens system comprising: a first lens element with positive refractive power having a convex object-side surface; a second lens element; a third lens element; a fourth lens element; and a fifth lens element with negative refractive power, at least one of the object-side and image-side surfaces thereof being aspheric, and at least one inflection point is formed on at least one of the object-side and image-side surfaces thereof; wherein the system at least has one front stop and one rear stop; which are positioned between an imaged object and the third lens element as well as between the third lens element and the fifth lens element, respectively. By such arrangement, photosensitivity and total track length of the system can be reduced, and the aberration and astigmatism of the system can be effectively corrected. Moreover, the focusing performance thereof can be improved.

20 Claims, 23 Drawing Sheets

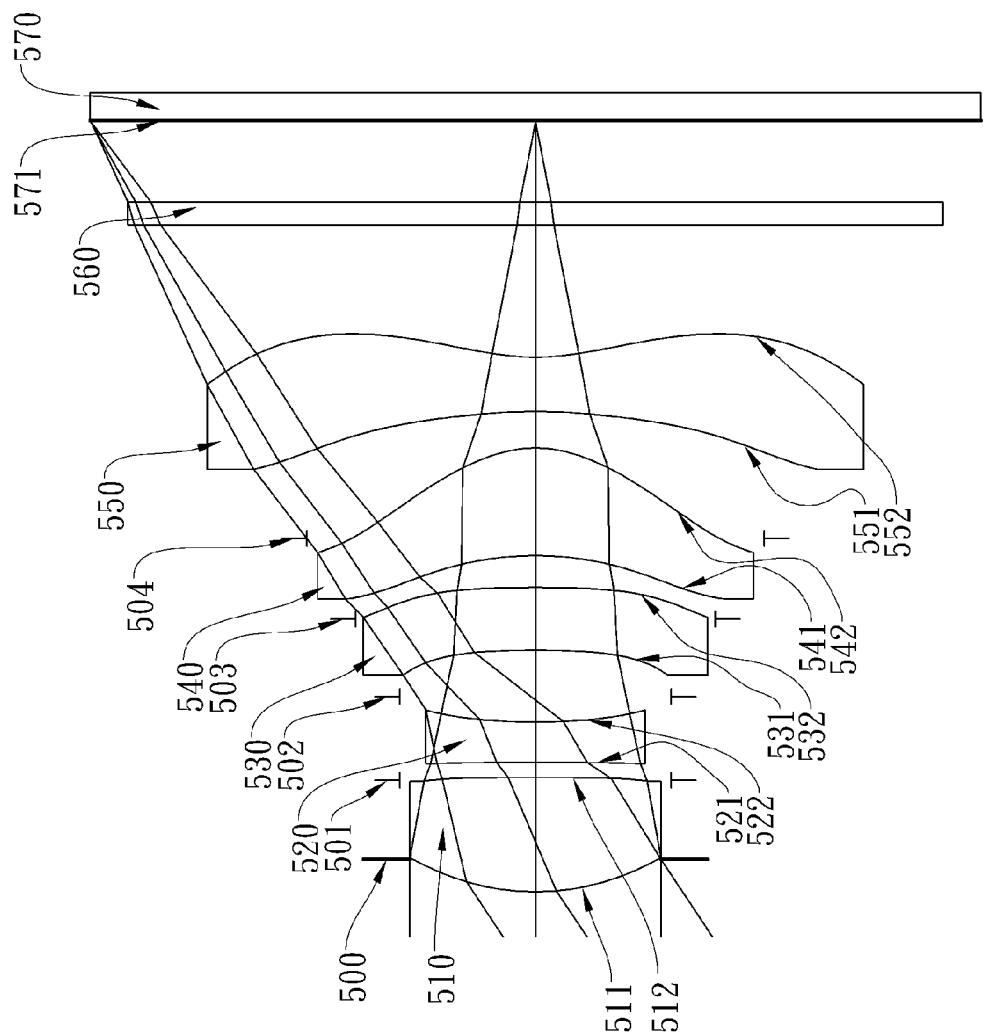

OPTICAL IMAGE CAPTURING LENS SYSTEM

CROSS-REFERENCE TO RELATED APPLICATIONS

This non-provisional application claims priority under 35 U.S.C. §119(a) on Patent Application No. 100125487 filed in Taiwan, R.O.C. on Jul. 19, 2011, the entire contents of which are hereby incorporated by reference.

BACKGROUND OF THE INVENTION

1. Field of the Invention

The present invention relates to an optical image capturing lens system, and more particularly, to a compact optical image capturing lens system used in electronic products.

2. Description of the Prior Art

In recent years, with the popularity of portable electronic products having photographing function, the demand of compact imaging lens system has grown. Generally, the sensor of a general photographing camera is none other than CCD (Charge Coupled Device) or CMOS device (Complementary Metal Oxide Semiconductor device). Furthermore, advances in semiconductor manufacturing technology have allowed the pixel size of sensors to be reduced and therefore lead compact imaging lens systems to higher resolution. In the meantime, the demand for better image quality is also increased.

A conventional imaging lens system with high resolving power, such as the one set forth in U.S. Pat. No. 7,365,920, generally has a front stop and four lens elements; wherein, the first and second lens elements are adhered together to form a doublet for correcting the chromatic aberration. However, this kind of arrangement has the following disadvantages. First, the degree of freedom in arranging the lens system is curtailed due to the employment of excessive number of spherical glass lenses; thus, the total track length of the system cannot be reduced easily. Second, the process of adhering glass lenses together is complicated, posing difficulties in manufacturing. Moreover, the popularity of high-class portable devices such as Smart Phone and PDA (Personal Digital Assistant) drives the rapid improvements in high resolution and image quality of the current compact imaging lens systems, conventional four lens elements systems no longer satisfy the higher level camera modules. On the other hand, a conventional image capturing lens system with five lens elements usually has the disadvantage of having an excessively long total track length, and thereby is not suitable for compact electronic devices.

Inasmuch as the foregoing, a need is continuously existed for a lens system with good image quality and moderate total track length and is suitable for compact and portable electronic products.

SUMMARY OF THE INVENTION

The present invention provides an optical image capturing lens system comprising, in order from an object side to an image side: a first lens element with positive refractive power having a convex object-side surface; a second lens element; a third lens element; a fourth lens element; and a fifth lens element with negative refractive power, at least one of the object-side and image-side surfaces thereof being aspheric, and at least one inflection point is formed on at least one of the object-side and image-side surfaces thereof; wherein the optical image capturing lens system at least has one front stop and one rear stop; the front stop is positioned between an imaged object and the third lens element; the rear stop is positioned between the third lens element and the fifth lens element; wherein an effective radius of the front stop is YF, a maximum image height on an image plane of the system is ImgH, an effective radius of the rear stop is YR, an axial distance between the object-side surface of the first lens element and the rear stop is DR, and they satisfy the following relations: $0.1<YF/ImgH<0.5$; $0.2<YR/ImgH<0.8$; and $0.4<DR/ImgH<1.2$.

On the other hand, the present invention provides an optical image capturing lens system comprising, in order from an object side to an image side: a first lens element with positive refractive power having a convex object-side surface; a second lens element with negative refractive power; a third lens element; a fourth lens element with positive refractive power having a concave object-side surface and a convex image-side surface, at least one of the object-side and the image-side surfaces being aspheric; and a fifth lens element with negative refractive power having a concave image-side surface, at least one of the object-side and image-side surfaces thereof being aspheric, and at least one inflection point is formed on at least one of the object-side and image-side surfaces thereof; wherein the optical image capturing lens system at least has one front stop and one rear stop; the front stop is positioned between an imaged object and the third lens element; the rear stop is positioned between the third lens element and the fifth lens element; wherein an effective radius of the rear stop is YR, an axial distance between the object-side surface of the first lens element and the rear stop is DR, and they satisfy the following relation: $0.4<YR/DR<1.0$.

By such arrangement, photosensitivity and total track length of the system can be reduced, and the aberration and astigmatism of the system can be effectively corrected. Moreover, the focusing performance thereof can be improved.

In the aforementioned optical image capturing lens system, the first lens element has positive refractive power and thereby can provide significant refractive power needed for the system and is favorable for reducing the total track length thereof. When the second lens element has negative refractive power, the aberration produced by the first lens element with positive refractive power can be effectively corrected. When the third lens element has negative refractive power, the third lens element can correct the aberration along with the second lens element. When the fourth lens element has positive refractive power, the refractive power of the first lens element can be effectively distributed for reducing the sensitivity of the system. Moreover, when the fourth lens element has positive refractive power and the fifth lens element has negative refractive power, a positive-negative telephoto structure is formed so that the back focal length of the system is favorably reduced as well as the total track length of the system.

In the aforementioned optical image capturing lens system, the first lens element can be a bi-convex lens element or a meniscus lens element having a convex object-side surface and a concave image-side surface. When the first lens element is a bi-convex lens element, the refractive power of the first lens element can be strengthened for reducing the total track length of the system. When the first lens element is a convex-concave meniscus lens element, it is favorable for correcting the astigmatism of the system. The second lens element has a concave image-side surface and the object-side surface thereof can be convex or concave. When the second lens element is a convex-concave meniscus lens element, the aberration provided by the first lens element can be favorably corrected, and the refractive power of the second lens element can be well-controlled for reducing the sensitivity of the system. When the second lens element is a concave-concave lens element, the negative refractive power can be strengthened for effectively correcting the chromatic aberration of the system. When the fourth lens element has a concave object-side surface and a convex image-side surface, the astigmatism can be effectively corrected. When the fifth lens element has a concave object-side surface, the negative refractive power of the fifth lens element can be properly adjusted to cooperate with the fourth lens element for obtaining the telephoto effect. When the fifth lens element has a concave image-side surface, the principal point of the system can be positioned away from the image plane, and the back focal length of the system is favorably reduced as well as the total track length of the system; therefore the system is kept compact. Furthermore, when at least one inflection is formed on the fifth lens element, the angle at which light projects onto the image sensor from the off-axis field can be effectively reduced so that the sensing efficiency of the image sensor can be improved and the off-axis aberration can be corrected.

BRIEF DESCRIPTION OF THE DRAWINGS

FIG. 5A shows an optical image capturing lens system in accordance with a fifth embodiment of the present invention.

DETAILED DESCRIPTION OF THE PREFERRED EMBODIMENTS

Figure 1A:
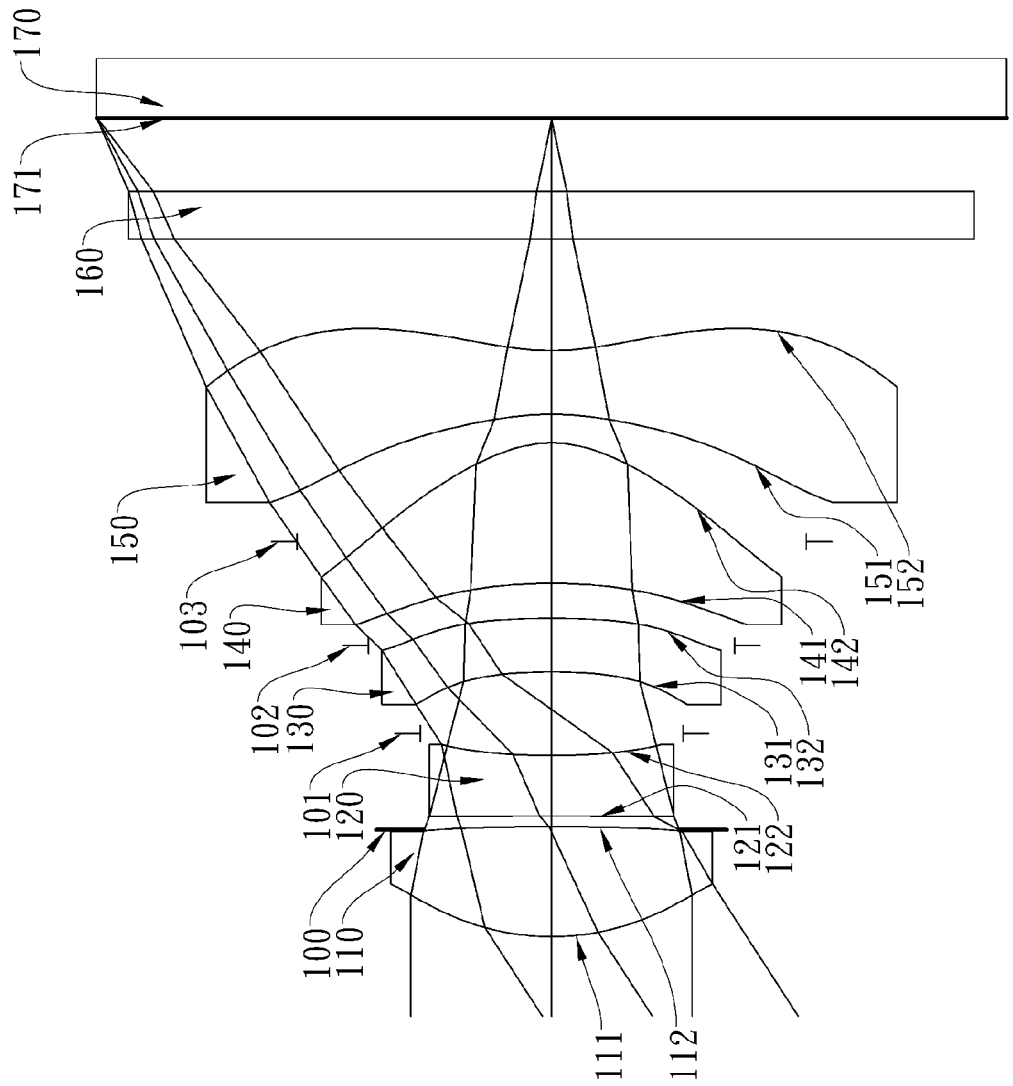
FIG. 1A shows an optical image capturing lens system in accordance with a first embodiment of the present invention.

The present invention provides an optical image capturing lens system comprising, in order from an object side to an image side: a first lens element with positive refractive power having a convex object-side surface; a second lens element; a third lens element; a fourth lens element; and a fifth lens element with negative refractive power, at least one of the object-side and image-side surfaces thereof being aspheric, and at least one inflection point is formed on at least one of the object-side and image-side surfaces thereof; wherein the optical image capturing lens system at least has one front stop and one rear stop; the front stop is positioned between an imaged object and the third lens element; the rear stop is positioned between the third lens element and the fifth lens element; wherein an effective radius of the front stop is YF, a maximum image height on an image plane of the system is ImgH, an effective radius of the rear stop is YR, an axial distance between the object-side surface of the first lens element and the rear stop is DR, and they satisfy the following relations: $0.1<YF/ImgH<0.5$; $0.2<YR/ImgH<0.8$; and $0.4<DR/ImgH<1.2$.

When the relation of $0.1<YF/ImgH<0.5$ is satisfied, sufficient light is obtained for the system, and thereby better image quality can be obtained.

When the relation of $0.2<YR/ImgH<0.8$ is satisfied, the size of the radius of the rear stop is more suitable for sheltering partial light in the system, and thereby the focusing performance of the system can be improved meanwhile the illumination thereof is not too low.

When the relation of $0.4<DR/ImgH<1.2$ is satisfied, the position of the rear stop in the system can be effectively controlled, which is favorably for the assembly and formation of the lens elements and the rear stop.

In the aforementioned optical image capturing lens system, the front stop is preferably an aperture stop, which is favorable for the telecentricity of the system and thereby not only the sensitivity of the image sensor can be improved, but also the occurrence of shading is reduced. Moreover, the total track length of the system can be favorably reduced. More preferably, the aperture stop is positioned between the first lens element and the second lens element.

In the aforementioned optical image capturing lens system, a focal length of the fifth lens element is f5, a focal length of the first lens element is f1, and they preferably satisfy the following relation: $-0.9<f5/f1<-0.3$. When the above relation is satisfied, the fifth lens element can provide a complementary function for balancing the distribution of the refractive power of the fourth lens element, and thereby the object of reducing the total track length of the system can be achieved.

In the aforementioned optical image capturing lens system, a focal length of the optical image capturing lens system is f, a focal length of the third lens element is f3, and they preferably satisfy the following relation: $-0.5<f/f3<0.3$. When the above relation is satisfied, the refractive power of the third lens element is more suitable for correcting the aberration of the system.

In the aforementioned optical image capturing lens system, a focal length of the optical image capturing lens system is f, a focal length of the fourth lens element is f4, a focal length of the fifth lens element is f5, and they preferably satisfy the following relation: 3.8<(f/f4)−(f/f5)<6.0. When the above relation is satisfied, the refractive power of the fourth lens element and the fifth lens element is more suitable for reducing the back focal length of the system as well as the total track length thereof.

In the aforementioned optical image capturing lens system, an Abbe number of the first lens element is V1, an Abbe number of the second lens element is V2, an Abbe number of the third lens element is V3, and they preferably satisfy the following relation: 0<V1−V2−V3<20. When the above relation is satisfied, the chromatic aberration of the system can be favorably corrected.

In the aforementioned optical image capturing lens system, the system further comprises an image sensor provided on an image plane, an axial distance between the object-side surface of the first lens element and the image plane is TTL, the maximum image height on the image plane of the system is ImgH, and they preferably satisfy the following relation: TTL/ImgH<2.0. When the above relation is satisfied, it is favorable for keeping the system compact in order to be equipped on portable electronic products.

On the other hand, the present invention provides an optical image capturing lens system comprising, in order from an object side to an image side: a first lens element with positive refractive power having a convex object-side surface; a second lens element with negative refractive power; a third lens element; a fourth lens element with positive refractive power having a concave object-side surface and a convex image-side surface, at least one of the object-side and the image-side surfaces being aspheric; and a fifth lens element with negative refractive power having a concave image-side surface, at least one of the object-side and image-side surfaces thereof being aspheric, and at least one inflection point is formed on at least one of the object-side and image-side surfaces thereof; wherein the optical image capturing lens system at least has one front stop and one rear stop; the front stop is positioned between an imaged object and the third lens element; the rear stop is positioned between the third lens element and the fifth lens element; wherein an effective radius of the rear stop is YR, an axial distance between the object-side surface of the first lens element and the rear stop is DR, and they satisfy the following relation: 0.4<YR/DR<1.0.

When the relation of 0.4<YR/DR<1.0 is satisfied, the unnecessary light in the system can be properly sheltered in order to prevent the unnecessary light from entering the imaging area through several times of refraction and reflection so that the image quality can be improved.

In the aforementioned optical image capturing lens system, an effective radius of the front stop is YF, a maximum image height on an image plane of the system is ImgH, and they preferably satisfy the following relation: 0.1<YF/ImgH<0.5. When the above relation is satisfied, sufficient light is obtained for the system, and thereby better image quality can be obtained.

In the aforementioned optical image capturing lens system, an effective radius of the rear stop is YR, a maximum image height on an image plane of the system is ImgH, and they preferably satisfy the following relation: 0.2<YR/ImgH<0.8. When the above relation is satisfied, the size of the radius of the rear stop is more suitable for sheltering partial light in the system, and thereby the focusing performance of the system can be improved meanwhile the illumination thereof is not too low.

In the aforementioned optical image capturing lens system, a curvature radius of the object-side surface of the fourth lens element is R7, a curvature radius of the image-side surface of the fourth lens element is R8, and they preferably satisfy the following relation: 1.2<(R7+R8)/(R7−R8)<2.5. When the above relation is satisfied, it can be sure that the fourth lens element is a meniscus lens element, which is favorable for correcting the astigmatism of the system.

In the aforementioned optical image capturing lens system, an axial distance between the first lens element and the second lens element is T12, an axial distance between the second lens element and the third lens element is T23, and they preferably satisfy the following relation: 0.02<T12/T23<0.3. When the above relation is satisfied, the interval between lens elements is more suitable, which is favorable not only for the assembly and arrangement of lens elements but also for the space usage inside the system so that the system can be kept compact.

In the aforementioned optical image capturing lens system, a focal length of the optical image capturing lens system is f, a focal length of the fourth lens element is f4, a focal length of the fifth lens element is f5, and they preferably satisfy the following relation: 3.8<(f/f4)−(f/f5)<6.0. When the above relation is satisfied, the refractive power of the fourth lens element and the fifth lens element is more suitable for reducing the back focal length of the system as well as the total track length thereof.

In the aforementioned optical image capturing lens system, a curvature radius of the object-side surface of the second lens element is R3, a curvature radius of the image-side surface of the second lens element is R4, and they preferably satisfy the following relation: −0.5<(R3+R4)/(R3−R4)<1.8. When the above relation is satisfied, the curvature of the second lens element is favorable for correcting the aberration of the system.

In the aforementioned optical image capturing lens system, the system further comprises an image sensor provided on an image plane, an axial distance between the object-side surface of the first lens element and the image plane is TTL, a maximum image height on an image plane of the system is ImgH, and they preferably satisfy the following relation: TTL/ImgH<2.0. When the above relation is satisfied, it is favorable for keeping the system compact in order to be equipped on portable electronic products.

In the aforementioned optical image capturing lens system, the lens elements can be made of glass or plastic material. If the lens elements are made of glass, the freedom for distributing the refractive power of the optical image capturing lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the optical image capturing lens system can be effectively reduced.

In the present optical image capturing lens system, if a lens element has a convex surface, it means the portion of the surface in proximity to the optical axis is convex; if a lens element has a concave surface, it means the portion of the surface in proximity to the optical axis is concave.

The present optical image capturing lens system may comprise at least four stops. A stop means a shading element with an inner hole for restricting the range and amount of the incident light. The stop described in the present invention includes, but not limits to aperture stop, glare stop or field stop, which can provide sufficient illumination and/or reducing stray light so that is favorable for improving image quality. The position of the stops means the position where a stop concerned has a minimum radius and substantively affects the optical path.

Figure 12:
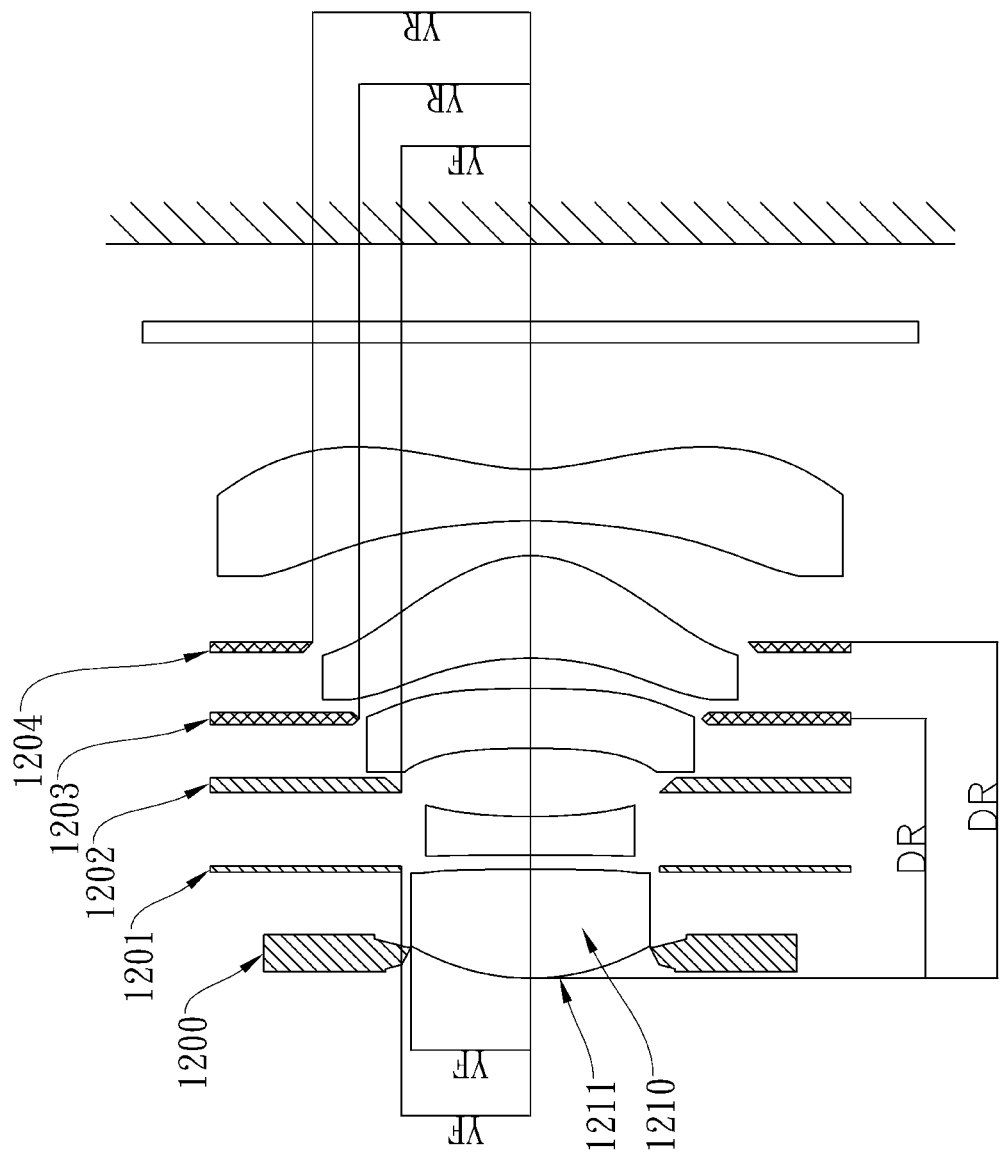
FIG. 12 shows the distance and relative position of YF, YR and DR of the present invention.

Please refer to FIG. 12, the distance and relative position of YF, YR and DR are presented. The front stop of the present invention means a stop positioned between an imaged object and the third lens element. The rear stop of the present invention means a stop positioned between the third lens element and the fifth lens element. According to the example showed in the FIG. 12, the optical image capturing lens system has three front stops 1200, 1201, 1202 and two rear stops 1203, 1204. An effective radius of the front stop 1200, 1201, 1202 is YF; an effective radius of the rear stop 1203, 1204 is YR; and an axial distance between the object-side surface 1211 of the first lens element 1210 and the rear stop 1203, 1204 is DR; wherein, the position of stops 1200, 1201, 1202, 1203, 1204 means the position where those stops 1200, 1201, 1202, 1203, 1204 has a minimum radius and substantively affects the optical path, respectively.

Preferred embodiments of the present invention will be described in the following paragraphs by referring to the accompanying drawings.

Embodiment 1

Figure 1B:
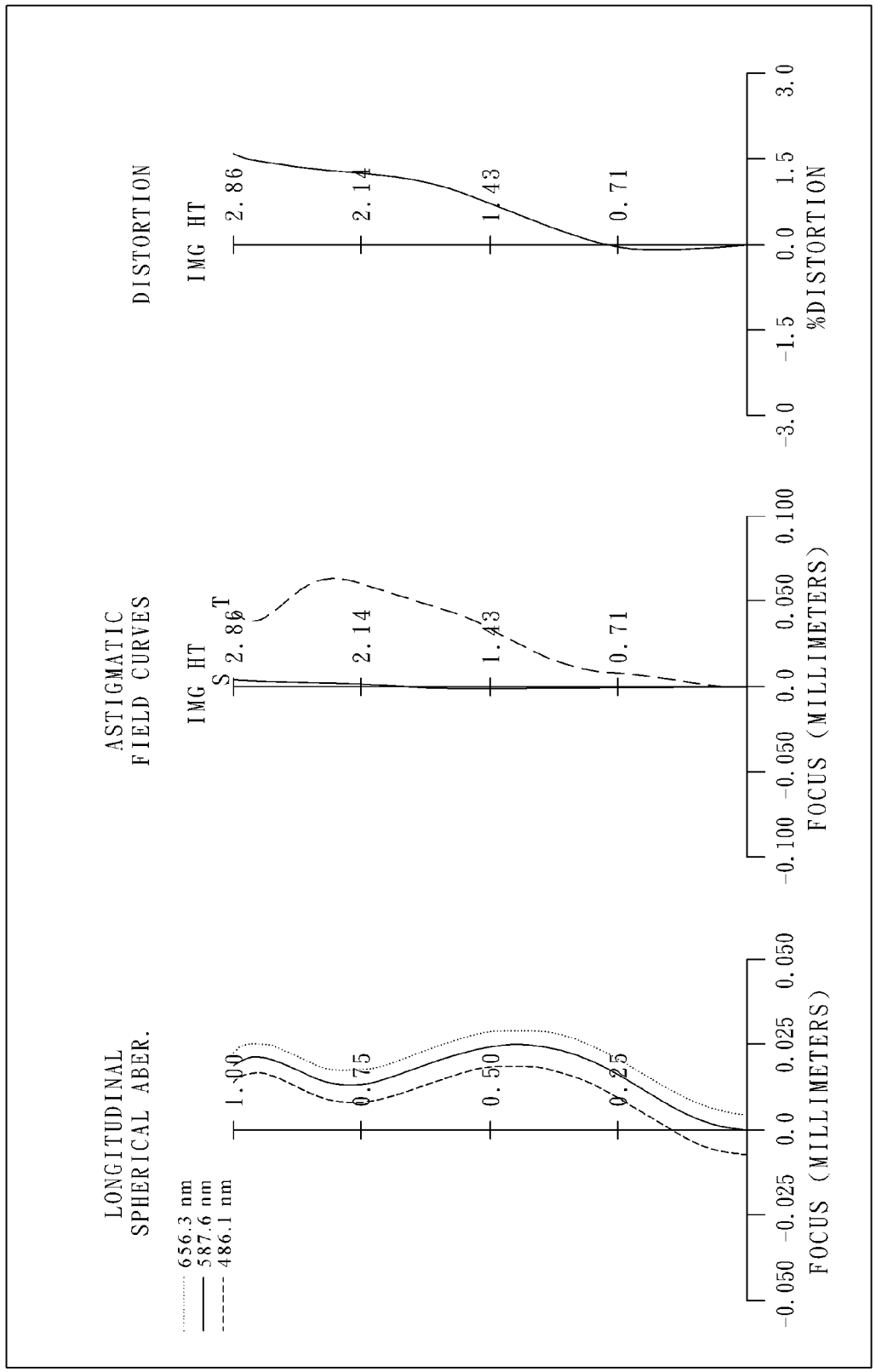
FIG. 1B shows the aberration curves of the first embodiment of the present invention.

FIG. 1A shows an optical image capturing lens system in accordance with the first embodiment of the present invention, and FIG. 1B shows the aberration curves of the first embodiment of the present invention. The optical image capturing lens system of the first embodiment of the present invention mainly comprises five lens elements, in order from an object side to an image side:

a first lens element 110 made of plastic with positive refractive power having a convex object-side surface 111 and a convex image-side surface 112, the object-side and image-side surfaces 111 and 112 thereof being aspheric;

a second lens element 120 made of plastic with negative refractive power having a concave object-side surface 121 and a concave image-side surface 122, the object-side and image-side surfaces 121 and 122 thereof being aspheric;

a third lens element 130 made of plastic with negative refractive power having a concave object-side surface 131 and a convex image-side surface 132, the object-side and image-side surfaces 131 and 132 thereof being aspheric;

a fourth lens element 140 made of plastic with positive refractive power having a concave object-side surface 141 and a convex image-side surface 142, the object-side and image-side surfaces 141 and 142 thereof being aspheric; and a fifth lens element 150 made of plastic with negative refractive power having a concave object-side surface 151 and a concave image-side surface 152, the object-side and image-side surfaces 151 and 152 thereof being aspheric, and at least one inflection point is formed on both the object-side surface 151 and the image-side surface 152 thereof;

wherein the optical image capturing lens system also comprises two front stops 100 (stop 12), 101 (stop 23), which are positioned between the first lens element 110 and the second lens element 120, and the second lens element 120 and the third lens element 130; wherein the front stop 100 (stop 12) is an aperture stop;

wherein the optical image capturing lens system also comprises two rear stops 102 (stop 34), 103 (stop 45), which are positioned between the third lens element 130 and the fourth lens element 140, and the fourth lens element 140 and the fifth lens element 150;

the optical image capturing lens system further comprises an IR filter 160 disposed between the image-side surface 152 of the fifth lens element 150 and an image plane 171, and the IR filter 160 is made of glass and has no influence on the focal length of the optical image capturing lens system; the optical image capturing lens system further comprises an image sensor 170 provided on the image plane 171.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 4.32 mm, Fno = 2.45, HFOV = 32.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.551230 (ASP) | 0.690 | Plastic | 1.544 | 55.9 | 2.67 |
| 2 | | −19.421300 (ASP) | −0.019 | | | | |
| 3 | Stop12 (Ape. Stop) | Plano | 0.087 | | | | |
| 4 | Lens 2 | −18.441800 (ASP) | 0.380 | Plastic | 1.632 | 23.4 | −5.54 |
| 5 | | 4.356800 (ASP) | 0.139 | | | | |
| 6 | Stop23 | Plano | 0.387 | | | | |
| 7 | Lens 3 | −3.587800 (ASP) | 0.336 | Plastic | 1.632 | 23.4 | −15.15 |
| 8 | | −5.945000 (ASP) | −0.172 | | | | |
| 9 | Stop34 | Plano | 0.393 | | | | |
| 10 | Lens 4 | −3.246500 (ASP) | 0.883 | Plastic | 1.544 | 55.9 | 1.54 |
| 11 | | −0.729920 (ASP) | −0.622 | | | | |
| 12 | Stop45 | Plano | 0.802 | | | | |
| 13 | Lens 5 | −1.747510 (ASP) | 0.400 | Plastic | 1.530 | 55.8 | −1.45 |
| 14 | | 1.485820 (ASP) | 0.700 | | | | |
| 15 | IR-filter | Plano | 0.300 | Glass | 1.517 | 64.2 | — |
| 16 | | Plano | 0.461 | | | | |
| 17 | Image | Plano | — | | | | |

\* Reference wavelength is 587.6 nm (d-line)

an effective radius of the stop 12 (YF) at surface 3 is 0.801 mm an effective radius of the stop 23 (YF) at surface 6 is 0.825 mm an effective radius of the stop 34 (YR) at surface 9 is 1.150 mm an effective radius of the stop 45 (YR) at surface 12 is 1.600 mm

TABLE 2

Aspheric Coefficients

| Surface # | 1 | 2 | 4 | 5 | 7 |
|---|---|---|---|---|---|
| k = | −8.08864E+00 | 1.00000E+00 | −2.00000E+01 | −1.75275E+00 | −4.58299E+01 |
| A4 = | 2.46838E−01 | −1.15210E−02 | 2.97528E−02 | 4.29207E−02 | −2.67200E−01 |
| A6 = | −2.31593E−01 | 5.43790E−02 | −1.07082E−02 | 1.35900E−02 | −1.47276E−01 |
| A8 = | 2.01178E−01 | −2.62985E−01 | 2.77809E−01 | 1.28708E−01 | 3.66474E−01 |
| A10 = | −1.31128E−01 | 3.97103E−01 | −9.81314E−01 | −3.00708E−01 | −4.08076E−01 |
| A12 = | 4.10997E−02 | −3.24745E−01 | 1.42254E+00 | 4.47389E−01 | 2.87589E−01 |
| A14 = | −1.66392E−02 | 1.07361E−01 | −7.16280E−01 | −1.67673E−01 | |

| Surface # | 8 | 10 | 11 | 13 | 14 |
|---|---|---|---|---|---|
| k = | −4.67507E+01 | 4.67284E+00 | −3.27795E+00 | −1.52633E+01 | −1.60677E+01 |
| A4 = | −1.10874E−01 | −2.04580E−02 | −1.37386E−01 | −1.65381E−02 | −5.73737E−02 |
| A6 = | −1.48853E−01 | 8.12903E−02 | 1.43288E−01 | −2.65918E−02 | 1.66625E−02 |
| A8 = | 1.81931E−01 | −2.22497E−01 | −1.24426E−01 | 1.20919E−02 | −6.04967E−03 |
| A10 = | −4.33830E−02 | 2.99115E−01 | 6.65884E−02 | −8.58655E−04 | 1.50000E−03 |
| A12 = | 6.95530E−03 | −1.68396E−01 | −1.66803E−02 | −1.94919E−04 | −2.17102E−04 |
| A14 = | | 3.55437E−02 | 1.41623E−03 | 2.19382E−05 | 1.36769E−05 |

The equation of the aspheric surface profiles is expressed as follows:

$$X(Y) = (Y^2/R)/(1 + sqrt(1-(1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical image capturing lens system, the focal length of the optical image capturing lens system is f, and it satisfies the following relation: f=4.32 (mm).

In the first embodiment of the present optical image capturing lens system, the f-number of the optical image capturing lens system is Fno, and it satisfies the relation: Fno=2.45.

In the first embodiment of the present optical image capturing lens system, half of the maximal field of view of the optical image capturing lens system is HFOV, and it satisfies the relation: HFOV=32.9 deg.

In the first embodiment of the present optical image capturing lens system, an Abbe number of the first lens element 110 is V1, an Abbe number of the second lens element 120 is V2, an Abbe number of the third lens element 130 is V3, and they satisfy the following relation: V1−V2−V3=9.1.

In the first embodiment of the present optical image capturing lens system, an axial distance between the first lens element 110 and the second lens element 120 is T12, an axial distance between the second lens element 120 and the third lens element 130 is T23, and they satisfy the following relation: T12/T23=0.13.

In the first embodiment of the present optical image capturing lens system, a curvature radius of the object-side surface 121 of the second lens element 120 is R3, a curvature radius of the image-side surface 122 of the second lens element 120 is R4, and they satisfy the following relation: (R3+R4)/(R3−R4)=0.62.

In the first embodiment of the present optical image capturing lens system, a curvature radius of the object-side surface 141 of the fourth lens element 140 is R7, a curvature radius of the image-side surface 142 of the fourth lens element 140 is R8, and they satisfy the following relation: (R7+R8)/(R7−R8)=1.58.

In the first embodiment of the present optical image capturing lens system, a focal length of the fifth lens element 150 is f5, a focal length of the first lens element 110 is f1, and they satisfy the following relation: f5/f1=−0.54.

In the first embodiment of the present optical image capturing lens system, the focal length of the optical image capturing lens system is f, a focal length of the third lens element 130 is f3, and they satisfy the following relation: f/f3=−0.29.

In the first embodiment of the present optical image capturing lens system, the focal length of the optical image capturing lens system is f, a focal length of the fourth lens element 140 is f4, the focal length of the fifth lens element 150 is f5, and they satisfy the following relation: (f/f4)−(f/f5)=5.78.

In the first embodiment of the present optical image capturing lens system, an effective radius of the front stop 100 (stop 12) is YF, a maximum image height on the image plane 171 of the system is ImgH, and they satisfy the following relation: YF/ImgH=0.28.

In the first embodiment of the present optical image capturing lens system, an effective radius of the front stop 101 (stop 23) is YF, a maximum image height on the image plane 171 of the system is ImgH, and they satisfy the following relation: YF/ImgH=0.26.

In the first embodiment of the present optical image capturing lens system, an effective radius of the rear stop 102 (stop 34) is YR, a maximum image height on the image plane 171 of the system is ImgH, and they satisfy the following relation: YR/ImgH=0.38.

In the first embodiment of the present optical image capturing lens system, an effective radius of the rear stop 103 (stop 45) is YR, a maximum image height on the image plane 171 of the system is ImgH, and they satisfy the following relation: YR/ImgH=0.56.

In the first embodiment of the present optical image capturing lens system, an axial distance between the object-side surface 111 of the first lens element 110 and the rear stop 102 (stop 34) is DR, a maximum image height on the image plane 171 of the system 170 is ImgH, and they satisfy the following relation: DR/ImgH=0.64.

In the first embodiment of the present optical image capturing lens system, an axial distance between the object-side surface 111 of the first lens element 110 and the rear stop 103 (stop 45) is DR, a maximum image height on the image plane 171 of the system is ImgH, and they satisfy the following relation: DR/ImgH=0.87.

In the first embodiment of the present optical image capturing lens system, an effective radius of the rear stop 102 (stop 34) is YR, an axial distance between the object-side surface 111 of the first lens element 110 and the rear stop 102 (stop 34) is DR, and they satisfy the following relation: YR/DR=0.60.

In the first embodiment of the present optical image capturing lens system, an effective radius of the rear stop 103 (stop 45) is YR, an axial distance between the object-side surface 111 of the first lens element 110 and the rear stop 103 (stop 45) is DR, and they satisfy the following relation: YR/DR=0.64.

In the first embodiment of the present optical image capturing lens system, an axial distance between the object-side surface 111 of the first lens element 110 and the image plane 171 is TTL, a maximum image height on the image plane 171 of the system is ImgH, and they satisfy the following relation: TTL/ImgH=1.77.

Embodiment 2

Figure 2A:
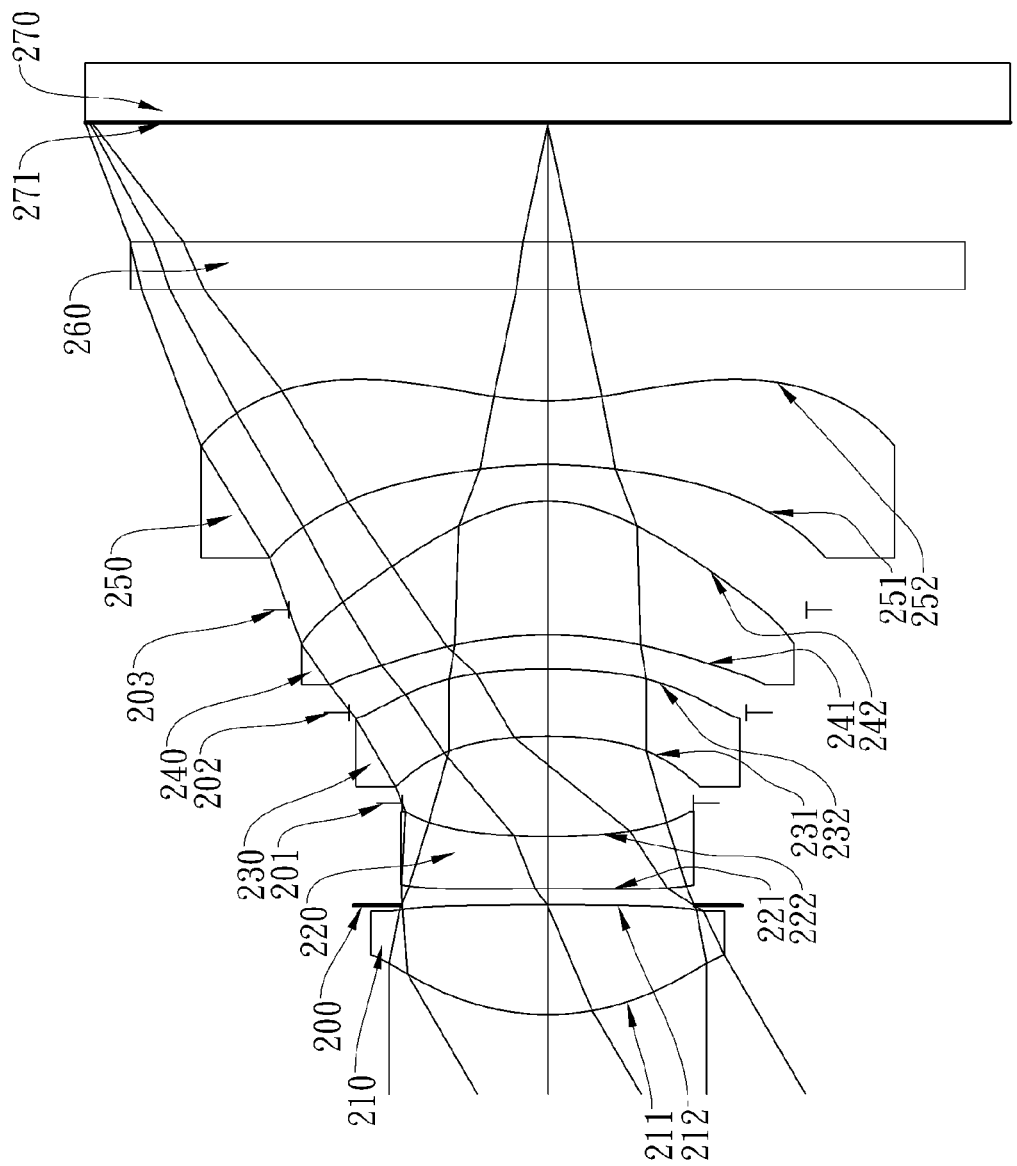
FIG. 2A shows an optical image capturing lens system in accordance with a second embodiment of the present invention.
Figure 2B:
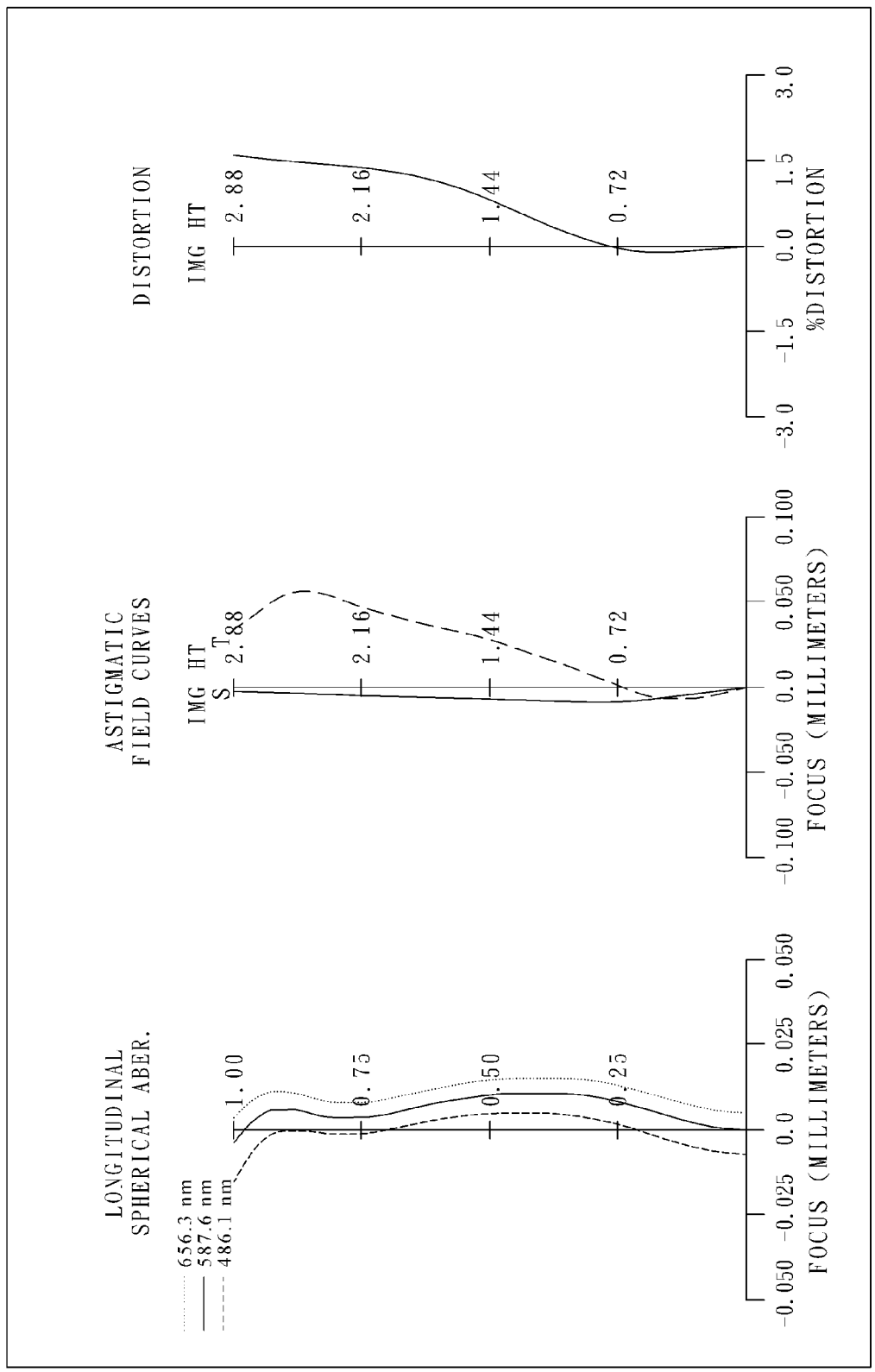
FIG. 2B shows the aberration curves of the second embodiment of the present invention.

FIG. 2A shows an optical image capturing lens system in accordance with the second embodiment of the present invention, and FIG. 2B shows the aberration curves of the second embodiment of the present invention. The optical image capturing lens system of the second embodiment of the present invention mainly comprises five lens elements, in order from an object side to an image side:

a first lens element 210 made of plastic with positive refractive power having a convex object-side surface 211 and a convex image-side surface 212, the object-side and image-side surfaces 211 and 212 thereof being aspheric;

a second lens element 220 made of plastic with negative refractive power having a concave object-side surface 221 and a concave image-side surface 222, the object-side and image-side surfaces 221 and 222 thereof being aspheric;

a third lens element 230 made of plastic with negative refractive power having a concave object-side surface 231 and a convex image-side surface 232, the object-side and image-side surfaces 231 and 232 thereof being aspheric;

a fourth lens element 240 made of plastic with positive refractive power having a concave object-side surface 241 and a convex image-side surface 242, the object-side and image-side surfaces 241 and 242 thereof being aspheric; and a fifth lens element 250 made of plastic with negative refractive power having a concave object-side surface 251 and a concave image-side surface 252, the object-side and image-side surfaces 251 and 252 thereof being aspheric, and at least one inflection point is formed on both the object-side surface 251 and the image-side surface 252 thereof;

wherein the optical image capturing lens system also comprises two front stops 200 (stop 12), 201 (stop 23), which are positioned between the first lens element 210 and the second lens element 220, and the second lens element 220 and the third lens element 230; wherein the front stop 200 (stop 12) is an aperture stop;

wherein the optical image capturing lens system also comprises two rear stops 202 (stop 34), 203 (stop 45), which are positioned between the third lens element 230 and the fourth lens element 240, and the fourth lens element 240 and the fifth lens element 250;

the optical image capturing lens system further comprises an IR filter 260 disposed between the image-side surface 252 of the fifth lens element 250 and an image plane 271, and the IR filter 260 is made of glass and has no influence on the focal length of the optical image capturing lens system; the optical image capturing lens system further comprises an image sensor 270 provided on the image plane 271.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 4.85 mm, Fno = 2.45, HFOV = 30.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.595050 (ASP) | 0.689 | Plastic | 1.544 | 55.9 | 2.85 |
| 2 | | −44.875500 (ASP) | −0.003 | | | | |
| 3 | Stop12 (Ape. Stop) | Plano | 0.105 | | | | |
| 4 | Lens 2 | −25.000000 (ASP) | 0.326 | Plastic | 1.632 | 23.4 | −5.74 |
| 5 | | 4.267200 (ASP) | 0.210 | | | | |
| 6 | Stop23 | Plano | 0.422 | | | | |
| 7 | Lens 3 | −2.866360 (ASP) | 0.422 | Plastic | 1.632 | 23.4 | −17.34 |
| 8 | | −4.103000 (ASP) | −0.272 | | | | |
| 9 | Stop34 | Plano | 0.487 | | | | |
| 10 | Lens 4 | −2.771920 (ASP) | 0.843 | Plastic | 1.544 | 55.9 | 2.00 |
| 11 | | −0.864720 (ASP) | −0.687 | | | | |
| 12 | Stop45 | Plano | 0.915 | | | | |
| 13 | Lens 5 | −2.800280 (ASP) | 0.400 | Plastic | 1.530 | 55.8 | −1.96 |
| 14 | | 1.731650 (ASP) | 0.700 | | | | |
| 15 | IR-filter | Plano | 0.300 | Glass | 1.517 | 64.2 | — |
| 16 | | Plano | 0.749 | | | | |
| 17 | Image | Plano | — | | | | |

* Reference wavelength is 587.6 nm (d-line)
an effective radius of the stop 12 (YF) at surface 3 is 0.920 mm
an effective radius of the stop 23 (YF) at surface 6 is 0.914 mm
an effective radius of the stop 34 (YR) at surface 9 is 1.247 mm
an effective radius of the stop 45 (YR) at surface 12 is 1.625 mm

TABLE 4

Aspheric Coefficients

| Surface # | 1 | 2 | 4 | 5 | 7 |
|---|---|---|---|---|---|
| k = | −6.59868E+00 | 1.00000E+00 | −1.47513E+01 | 1.39767E−15 | −1.45788E+01 |
| A4 = | 1.88908E−01 | −2.07900E−02 | 3.59197E−02 | 5.89110E−02 | −2.15720E−01 |
| A6 = | −1.39518E−01 | 4.06450E−02 | −1.36732E−03 | 1.41823E−02 | −1.00347E−01 |
| A8 = | 1.01088E−01 | −1.27051E−01 | 1.21793E−01 | 5.73711E−02 | 1.71360E−01 |
| A10 = | −6.07834E−02 | 1.45159E−01 | −3.16396E−01 | −9.41661E−02 | −1.85988E−01 |
| A12 = | 1.66607E−02 | −9.52121E−02 | 3.80129E−01 | 1.37616E−01 | 1.06062E−01 |
| A14 = | −8.14078E−03 | 2.35735E−02 | −1.57284E−01 | −3.68184E−02 | |

| Surface # | 8 | 10 | 11 | 13 | 14 |
|---|---|---|---|---|---|
| k = | 1.00000E+00 | 2.38885E+00 | −3.32033E+00 | −3.61059E+01 | −1.48460E+01 |
| A4 = | −8.11479E−02 | −4.95464E−03 | −9.65746E−02 | −1.94296E−02 | −5.28875E−02 |
| A6 = | −6.52166E−02 | 6.92739E−02 | 9.03937E−02 | −1.96532E−02 | 1.14890E−02 |
| A8 = | 7.20277E−02 | −9.51186E−02 | −5.77547E−02 | 7.34920E−03 | −3.09288E−03 |
| A10 = | −1.72256E−02 | 9.98295E−02 | 2.37241E−02 | −4.43711E−04 | 5.96480E−04 |
| A12 = | 3.89600E−03 | −4.93576E−02 | −4.47898E−03 | −1.71125E−04 | −7.12886E−05 |
| A14 = | | 8.98388E−03 | −1.19601E−05 | −2.23360E−06 | 2.83766E−06 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| f | 4.85 | YF/ImgH | Stop 01 | — |
|---|---|---|---|---|
| Fno | 2.45 | | Stop 12 | 0.32 |
| HFOV | 30.3 | | Stop 23 | 0.32 |
| V1 − V2 − V3 | 9.1 | YR/ImgH | Stop 34 | 0.43 |
| T12/T23 | 0.16 | | Stop 45 | 0.56 |
| (R3 + R4)/(R3 − R4) | 0.71 | DR/ImgH | Stop 34 | 0.66 |
| (R7 + R8)/(R7 − R8) | 1.91 | | Stop 45 | 0.88 |
| f5/f1 | −0.69 | YR/DR | Stop 34 | 0.65 |
| f/f3 | −0.28 | | Stop 45 | 0.64 |
| (f/f4) − (f/f5) | 4.90 | TTL/ImgH | | 1.91 |

Embodiment 3

Figure 3A:
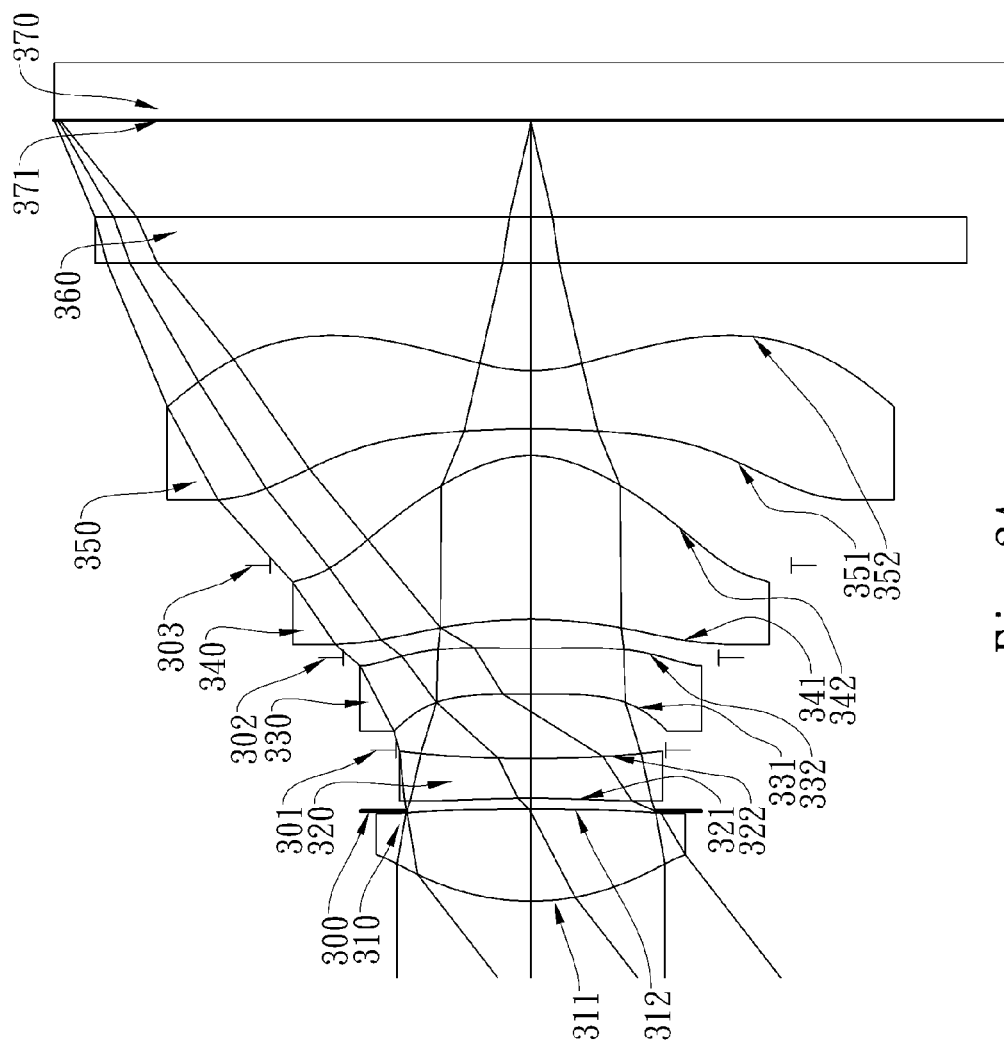
FIG. 3A shows an optical image capturing lens system in accordance with a third embodiment of the present invention.
Figure 3B:
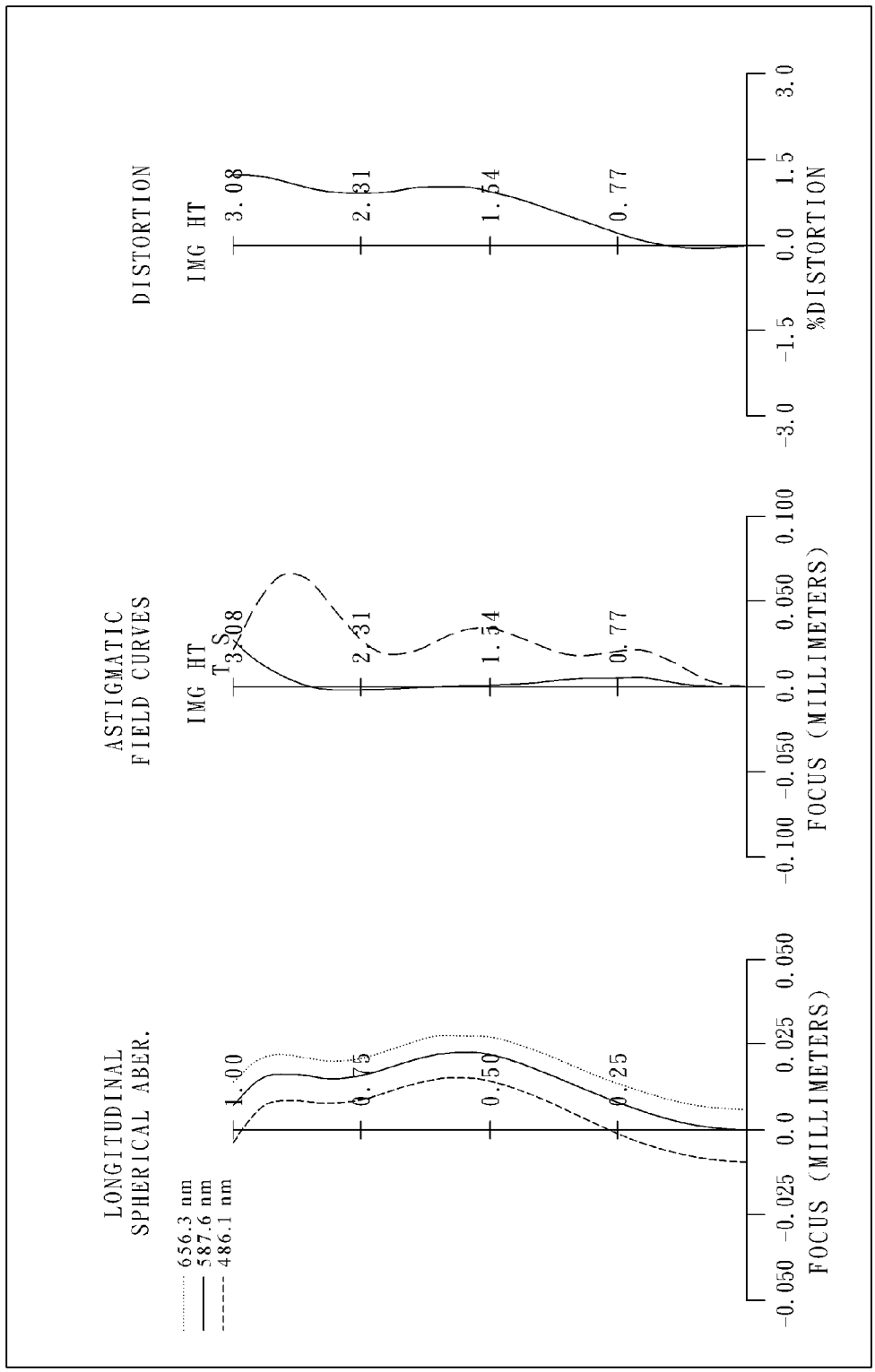
FIG. 3B shows the aberration curves of the third embodiment of the present invention.

FIG. 3A shows an optical image capturing lens system in accordance with the third embodiment of the present invention, and FIG. 3B shows the aberration curves of the third embodiment of the present invention. The optical image capturing lens system of the third embodiment of the present invention mainly comprises five lens elements, in order from an object side to an image side:

a first lens element 310 made of plastic with positive refractive power having a convex object-side surface 311 and a convex image-side surface 312, the object-side and image-side surfaces 311 and 312 thereof being aspheric;

a second lens element 320 made of plastic with negative refractive power having a concave object-side surface 321 and a concave image-side surface 322, the object-side and image-side surfaces 321 and 322 thereof being aspheric;

a third lens element 330 made of plastic with negative refractive power having a concave object-side surface 331 and a concave image-side surface 332, the object-side and image-side surfaces 331 and 332 thereof being aspheric;

a fourth lens element 340 made of plastic with positive refractive power having a concave object-side surface 341 and a convex image-side surface 342, the object-side and image-side surfaces 341 and 342 thereof being aspheric; and a fifth lens element 350 made of plastic with negative refractive power having a concave object-side surface 351 and a concave image-side surface 352, the object-side and image-side surfaces 351 and 352 thereof being aspheric, and at least one inflection point is formed on both the object-side surface 351 and the image-side surface 352 thereof;

wherein the optical image capturing lens system also comprises two front stops 300 (stop 12), 301 (stop 23), which are positioned between the first lens element 310 and the second lens element 320, and the second lens element 320 and the third lens element 330; wherein the front stop 300 (stop 12) is an aperture stop;

wherein the optical image capturing lens system also comprises two rear stops 302 (stop 34), 303 (stop 45), which are positioned between the third lens element 330 and the fourth lens element 340, and the fourth lens element 340 and the fifth lens element 350;

the optical image capturing lens system further comprises an IR filter 360 disposed between the image-side surface 352 of the fifth lens element 350 and an image plane 371, and the IR filter 360 is made of glass and has no influence on the focal length of the optical image capturing lens system; the optical image capturing lens system further comprises an image sensor 370 provided on the image plane 371.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 3.93 mm, Fno = 2.25, HFOV = 37.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.631250 (ASP) | 0.599 | Plastic | 1.544 | 55.9 | 2.82 |
| 2 | | −22.086000 (ASP) | −0.011 | | | | |

TABLE 6-continued (Embodiment 3)
f = 3.93 mm, Fno = 2.25, HFOV = 37.7 deg.

| Surface # | | Curvature Radius | | Thickness | Material | Index | Abbe # | Focal length |
|---|---|---|---|---|---|---|---|---|
| 3 | Stop12 (Ape. Stop) | Plano | | 0.082 | | | | |
| 4 | Lens 2 | −8.487800 | (ASP) | 0.260 | Plastic | 1.634 | 23.8 | −6.53 |
| 5 | | 8.176100 | (ASP) | 0.055 | | | | |
| 6 | Stop23 | Plano | | 0.367 | | | | |
| 7 | Lens 3 | −26.679400 | (ASP) | 0.296 | Plastic | 1.634 | 23.8 | −12.38 |
| 8 | | 11.168700 | (ASP) | −0.060 | | | | |
| 9 | Stop34 | Plano | | 0.251 | | | | |
| 10 | Lens 4 | −2.964900 | (ASP) | 1.070 | Plastic | 1.544 | 55.9 | 1.48 |
| 11 | | −0.713450 | (ASP) | −0.720 | | | | |
| 12 | Stop45 | Plano | | 0.893 | | | | |
| 13 | Lens 5 | −6.048000 | (ASP) | 0.380 | Plastic | 1.530 | 55.8 | −1.55 |
| 14 | | 0.970110 | (ASP) | 0.700 | | | | |
| 15 | IR-filter | Plano | | 0.300 | Glass | 1.517 | 64.2 | — |
| 16 | | Plano | | 0.633 | | | | |
| 17 | Image | Plano | | — | | | | |

* Reference wavelength is 587.6 nm (d-line)
an effective radius of the stop 12 (YF) at surface 3 is 0.810 mm
an effective radius of the stop 23 (YF) at surface 6 is 0.880 mm
an effective radius of the stop 34 (YR) at surface 9 is 1.225 mm
an effective radius of the stop 45 (YR) at surface 12 is 1.700 mm

TABLE 7

Aspheric Coefficients

| Surface # | 1 | 2 | 4 | 5 | 7 |
|---|---|---|---|---|---|
| k = | −7.84959E+00 | −3.69160E+01 | −1.38301E+01 | −7.75471E+01 | 1.05096E−14 |
| A4 = | 2.21378E−01 | −9.81540E−03 | 3.20754E−02 | 2.16132E−02 | −2.85368E−01 |
| A6 = | −2.17744E−01 | 6.35501E−02 | −3.39326E−03 | −5.61820E−02 | −2.03409E−01 |
| A8 = | 2.17989E−01 | −2.73477E−01 | 2.82456E−02 | 2.49286E−01 | 3.04297E−01 |
| A10 = | −1.62200E−01 | 4.14558E−02 | −9.86176E−01 | −4.94724E−01 | −4.63269E−01 |
| A12 = | 4.67578E−02 | −3.53640E−01 | 1.40670E+00 | 4.62753E−01 | 3.10329E−01 |
| A14 = | −1.75310E−02 | 1.17914E−01 | −6.97772E−01 | −1.63520E−01 | |

| Surface # | 8 | 10 | 11 | 13 | 14 |
|---|---|---|---|---|---|
| k = | −1.44693E−16 | 4.03346E+00 | −3.42420E+00 | −2.09657E+02 | −8.36861E+00 |
| A4 = | −1.50520E−01 | 3.27071E−02 | −1.71403E−01 | −2.90691E−02 | −6.80260E−02 |
| A6 = | −1.00506E−01 | 9.14137E−02 | 1.62923E−01 | −2.71570E−02 | 2.03467E−02 |
| A8 = | 1.46708E−01 | −2.15880E−01 | −1.32312E−01 | 1.24777E−02 | −6.93061E−03 |
| A10 = | −4.81440E−02 | 2.92429E−01 | 6.97642E−02 | −9.82661E−04 | 1.62716E−03 |
| A12 = | 1.36827E−02 | −1.70810E−01 | −1.45909E−02 | −1.60771E−04 | −2.13614E−04 |
| A14 = | | 3.76300E−02 | 5.99707E−04 | 1.99950E−05 | 1.16994E−05 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| f | 3.93 | YF/ImgH | Stop 01 | — |
|---|---|---|---|---|
| Fno | 2.25 | | Stop 12 | 0.26 |
| HFOV | 37.7 | | Stop 23 | 0.28 |
| V1 − V2 − V3 | 8.3 | YR/ImgH | Stop 34 | 0.38 |
| T12/T23 | 0.17 | | Stop 45 | 0.54 |
| (R3 + R4)/(R3 − R4) | 0.02 | DR/ImgH | Stop 34 | 0.51 |
| (R7 + R8)/(R7 − R8) | 1.63 | | Stop 45 | 0.71 |
| f5/f1 | −0.55 | YR/DR | Stop 34 | 0.74 |
| f/f3 | −0.32 | | Stop 45 | 0.75 |
| (f/f4) − (f/f5) | 5.19 | TTL/ImgH | | 1.62 |

Embodiment 4

Figure 4A:
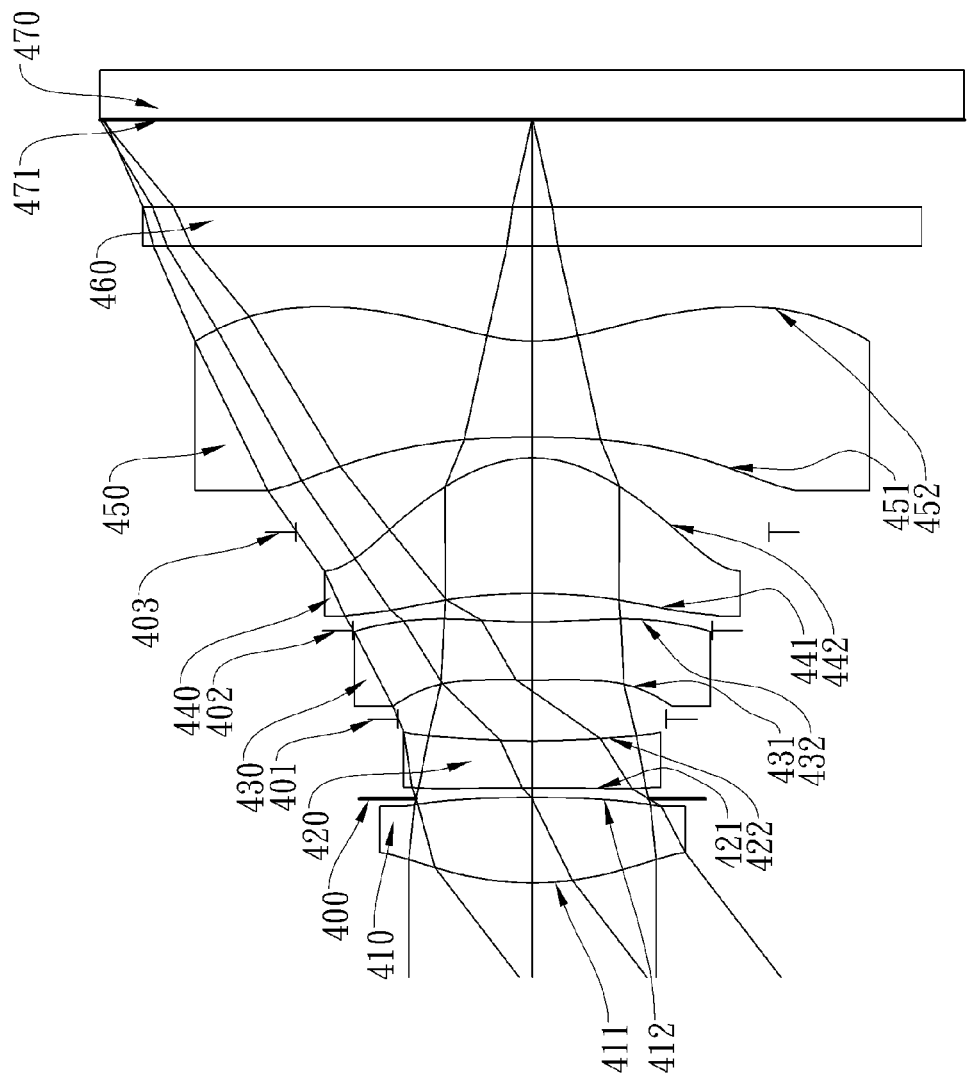
FIG. 4A shows an optical image capturing lens system in accordance with a fourth embodiment of the present invention.
Figure 4B:
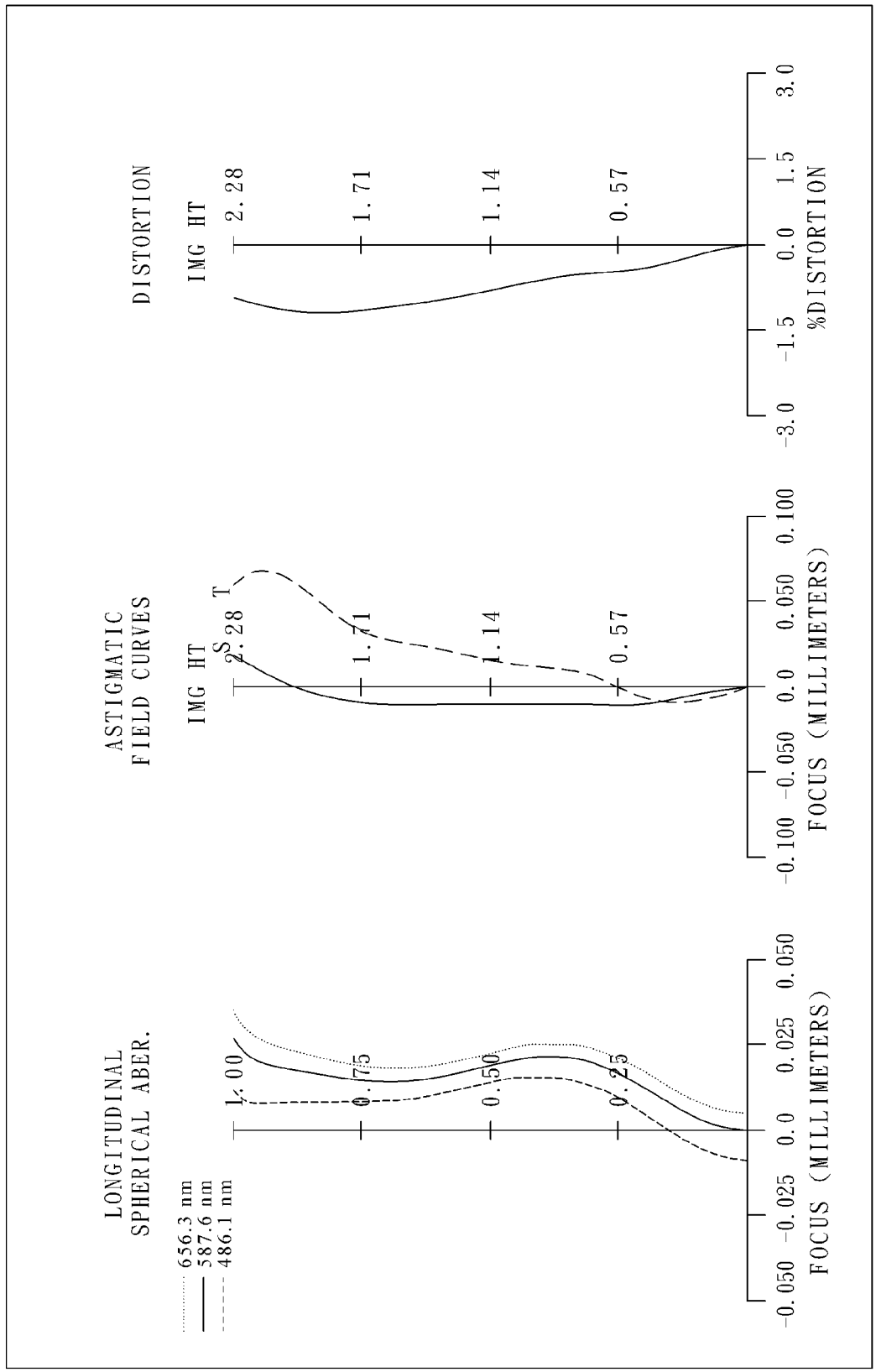
FIG. 4B shows the aberration curves of the fourth embodiment of the present invention.

FIG. 4A shows an optical image capturing lens system in accordance with the fourth embodiment of the present invention, and FIG. 4B shows the aberration curves of the fourth embodiment of the present invention. The optical image capturing lens system of the fourth embodiment of the present invention mainly comprises five lens elements, in order from an object side to an image side:

a first lens element 410 made of plastic with positive refractive power having a convex object-side surface 411 and a convex image-side surface 412, the object-side and image-side surfaces 411 and 412 thereof being aspheric;

a second lens element 420 made of plastic with negative refractive power having a convex object-side surface 421 and a concave image-side surface 422, the object-side and image-side surfaces 421 and 422 thereof being aspheric;

a third lens element 430 made of plastic with negative refractive power having a convex object-side surface 431 and a concave image-side surface 432, the object-side and image-side surfaces 431 and 432 thereof being aspheric;

a fourth lens element 440 made of plastic with positive refractive power having a concave object-side surface 441 and a convex image-side surface 442, the object-side and image-side surfaces 441 and 442 thereof being aspheric; and a fifth lens element 450 made of plastic with negative refractive power having a concave object-side surface 451 and a concave image-side surface 452, the object-side and image-side surfaces 451 and 452 thereof being aspheric, and at least one inflection point is formed on both the object-side surface 451 and the image-side surface 452 thereof;

wherein the optical image capturing lens system also comprises two front stops 400 (stop 12), 401 (stop 23), which are positioned between the first lens element 410 and the second lens element 420, and the second lens element 420 and the third lens element 430; wherein the front stop 400 (stop 12) is an aperture stop;

wherein the optical image capturing lens system also comprises two rear stops 402 (stop 34), 403 (stop 45), which are positioned between the third lens element 430 and the fourth lens element 440, and the fourth lens element 440 and the fifth lens element 450;

the optical image capturing lens system further comprises an IR filter 460 disposed between the image-side surface 452 of the fifth lens element 450 and an image plane 471, and the IR filter 460 is made of glass and has no influence on the focal length of the optical image capturing lens system; the optical image capturing lens system further comprises an image sensor 470 provided on the image plane 471.

The detailed optical data of the fourth embodiment is shown in TABLE 9, and the aspheric surface data is shown in TABLE 10, wherein the units of the radius of curvature, the thickness and the focal length are expressed in mm, and HFOV is half of the maximal field of view.

TABLE 9

(Embodiment 4)
f = 3.00 mm, Fno = 2.28, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.578980 (ASP) | 0.451 | Plastic | 1.544 | 55.9 | 2.59 |
| 2 | | −11.918000 (ASP) | −0.006 | | | | |
| 3 | Stop12 (Ape. Stop) | Plano | 0.056 | | | | |
| 4 | Lens 2 | 45.892100 (ASP) | 0.250 | Plastic | 1.634 | 23.8 | −7.16 |
| 5 | | 4.124000 (ASP) | 0.114 | | | | |
| 6 | Stop23 | Plano | 0.208 | | | | |
| 7 | Lens 3 | 11.919700 (ASP) | 0.307 | Plastic | 1.634 | 23.8 | −7.57 |
| 8 | | 3.388200 (ASP) | −0.045 | | | | |
| 9 | Stop34 | Plano | 0.197 | | | | |
| 10 | Lens 4 | −3.211200 (ASP) | 0.718 | Plastic | 1.544 | 55.9 | 1.31 |
| 11 | | −0.627470 (ASP) | −0.395 | | | | |
| 12 | Stop45 | Plano | 0.503 | | | | |
| 13 | Lens 5 | −5.954000 (ASP) | 0.509 | Plastic | 1.544 | 55.9 | −1.39 |
| 14 | | 0.891360 (ASP) | 0.500 | | | | |
| 15 | IR-filter | Plano | 0.210 | Glass | 1.517 | 64.2 | — |
| 16 | | Plano | 0.461 | | | | |
| 17 | Image | Plano | — | | | | |

* Reference wavelength is 587.6 nm (d-line)

an effective radius of the stop 12 (YF) at surface 3 is 0.615 mm an effective radius of the stop 23 (YF) at surface 6 is 0.710 mm an effective radius of the stop 34 (YR) at surface 9 is 0.950 mm an effective radius of the stop 45 (YR) at surface 12 is 1.250 mm

TABLE 10

| Aspheric Coefficients | | | | | |
|---|---|---|---|---|---|
| Surface # | 1 | 2 | 4 | 5 | 7 |
| k = | −1.54245E+01 | 0.00000E+00 | 0.00000E+00 | 1.31625E+01 | 0.00000E+00 |
| A4 = | 4.02512E−01 | −3.38314E−01 | −3.59034E−01 | −2.53431E−01 | −5.98183E−01 |
| A6 = | −8.61253E−01 | 1.11062E+00 | 1.53828E+00 | 5.05667E−01 | 2.63983E−01 |
| A8 = | 9.63210E−01 | −2.40209E+00 | −1.93446E+00 | 8.87285E−02 | −1.52735E+00 |
| A10 = | −3.94422E−01 | 2.99997E+00 | −6.39462E−01 | −2.00616E+00 | 3.31222E+00 |
| A12 = | −1.04595E+00 | −2.52195E+00 | 5.45735E+00 | 3.23732E+00 | −1.93463E+00 |
| A14 = | 1.04739E+00 | 1.49388E+00 | −4.51671E+00 | −1.14527E+00 | |
| Surface # | 8 | 10 | 11 | 13 | 14 |
| k = | 0.00000E+00 | −9.16272E+01 | −2.81067E+00 | 0.00000E+00 | −7.85544E+00 |
| A4 = | −4.24339E−01 | −4.12092E−01 | −3.49120E−01 | −1.32404E−01 | −1.70538E−01 |
| A6 = | 4.92056E−01 | 9.41930E−01 | 3.77913E−01 | 8.54605E−02 | 1.24811E−01 |
| A8 = | −9.11910E−01 | −1.25946E+00 | −4.67597E−01 | 1.18747E−02 | −6.84417E−02 |
| A10 = | 1.17653E+00 | 1.17911E+00 | 5.23707E−01 | −5.46705E−02 | 2.30410E−02 |
| A12 = | −5.66121E−01 | −5.43741E−01 | −1.82901E−01 | 3.09203E−02 | −4.36967E−03 |
| A14 = | | 4.70324E−02 | | −5.36876E−03 | 3.56225E−04 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f | 3.00 | YF/ImgH | Stop 01 | — |
|---|---|---|---|---|
| Fno | 2.28 | | Stop 12 | 0.27 |
| HFOV | 37.5 | | Stop 23 | 0.31 |
| V1 − V2 − V3 | 8.3 | YR/ImgH | Stop 34 | 0.41 |
| T12/T23 | 0.16 | | Stop 45 | 0.54 |
| (R3 + R4)/(R3 − R4) | 1.20 | DR/ImgH | Stop 34 | 0.58 |
| (R7 + R8)/(R7 − R8) | 1.49 | | Stop 45 | 0.81 |
| f5/f1 | −0.54 | YR/DR | Stop 34 | 0.71 |
| f/f3 | −0.40 | | Stop 45 | 0.67 |
| (f/f4) − (f/f5) | 4.45 | TTL/ImgH | | 1.74 |

Embodiment 5

Figure 5B:
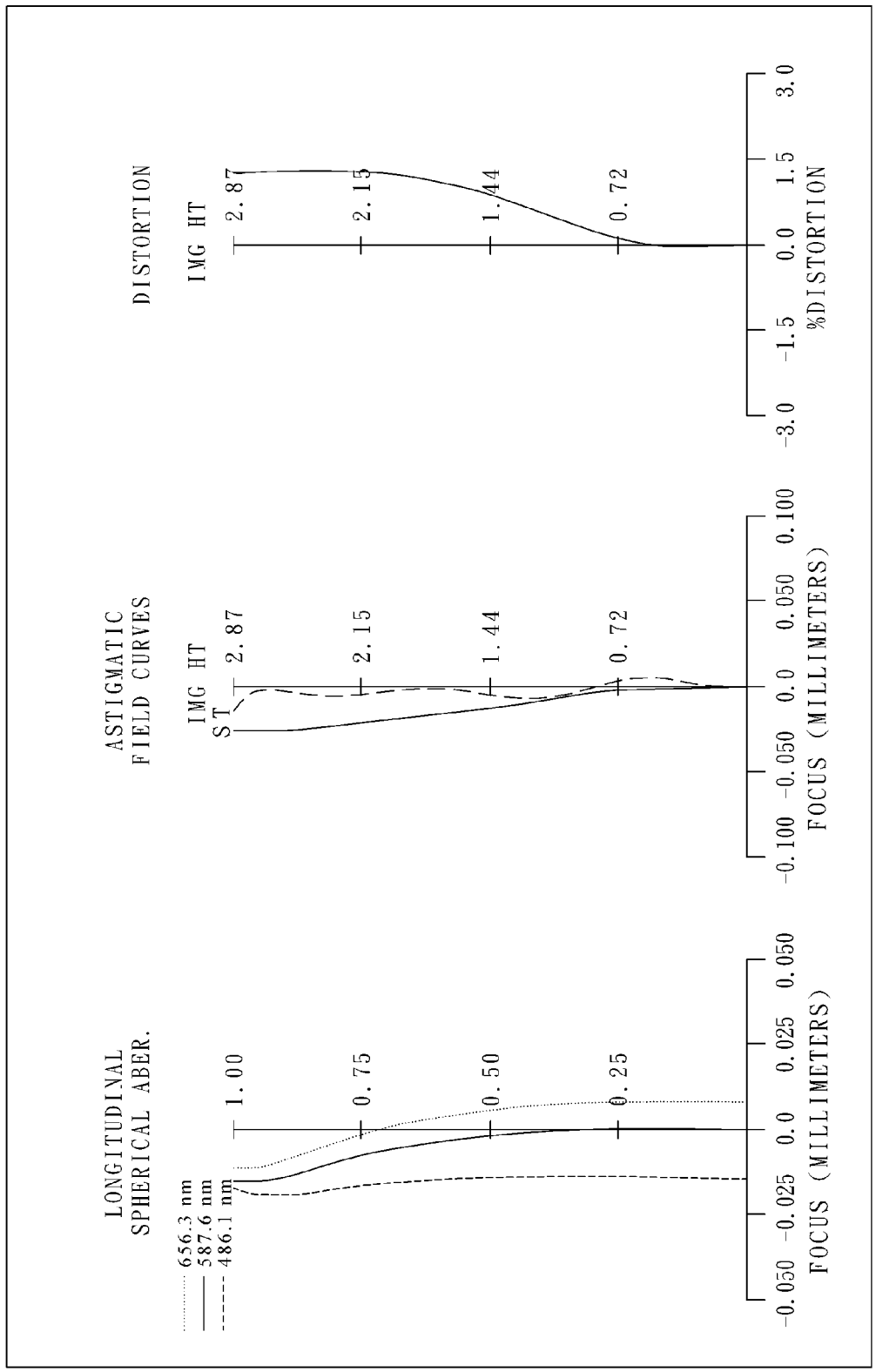
FIG. 5B shows the aberration curves of the fifth embodiment of the present invention.

FIG. 5A shows an optical image capturing lens system in accordance with the fifth embodiment of the present invention, and FIG. 5B shows the aberration curves of the fifth embodiment of the present invention. The optical image capturing lens system of the fifth embodiment of the present invention mainly comprises five lens elements, in order from an object side to an image side:

a first lens element 510 made of plastic with positive refractive power having a convex object-side surface 511 and a convex image-side surface 512, the object-side and image-side surfaces 511 and 512 thereof being aspheric;

a second lens element 520 made of plastic with negative refractive power having a concave object-side surface 521 and a concave image-side surface 522, the object-side and image-side surfaces 521 and 522 thereof being aspheric;

a third lens element 530 made of plastic with negative refractive power having a concave object-side surface 531 and a convex image-side surface 532, the object-side and image-side surfaces 531 and 532 thereof being aspheric;

a fourth lens element 540 made of plastic with positive refractive power having a concave object-side surface 541 and a convex image-side surface 542, the object-side and image-side surfaces 541 and 542 thereof being aspheric; and a fifth lens element 550 made of plastic with negative refractive power having a concave object-side surface 551 and a concave image-side surface 552, the object-side and image-side surfaces 551 and 552 thereof being aspheric, and at least one inflection point is formed on both the object-side surface 551 and the image-side surface 552 thereof;

wherein the optical image capturing lens system also comprises three front stops 500 (stop 01), 501 (stop 12), 502 (stop 23), which are positioned between an imaged object and the first lens element, the first lens element 510 and the second lens element 520, and the second lens element 520 and the third lens element 530; wherein the front stop 500 (stop 01) is an aperture stop;

wherein the optical image capturing lens system also comprises two rear stops 503 (stop 34), 504 (stop 45), which are positioned between the third lens element 530 and the fourth lens element 540, and the fourth lens element 540 and the fifth lens element 550;

the optical image capturing lens system further comprises an IR filter 560 disposed between the image-side surface 552 of the fifth lens element 550 and an image plane 571, and the IR filter 560 is made of glass and has no influence on the focal length of the optical image capturing lens system; the optical image capturing lens system further comprises an image sensor 570 provided on the image plane 571.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
f = 4.28 mm, Fno = 2.60, HFOV = 33.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Stop01 (Ape. Stop) | Plano | −0.209 | | | | |
| 2 | Lens 1 | 1.548880 (ASP) | 0.737 | Plastic | 1.544 | 55.9 | 2.78 |
| 3 | | −55.555600 (ASP) | −0.018 | | | | |
| 4 | Stop12 | Plano | 0.116 | | | | |
| 5 | Lens 2 | −23.895800 (ASP) | 0.260 | Plastic | 1.634 | 23.8 | −5.48 |
| 6 | | 4.082100 (ASP) | 0.164 | | | | |
| 7 | Stop23 | Plano | 0.299 | | | | |
| 8 | Lens 3 | −7.086300 (ASP) | 0.405 | Plastic | 1.634 | 23.8 | −30.02 |
| 9 | | −11.539000 (ASP) | −0.204 | | | | |
| 10 | Stop34 | Plano | 0.410 | | | | |
| 11 | Lens 4 | −2.164330 (ASP) | 0.695 | Plastic | 1.544 | 55.9 | 1.87 |
| 12 | | −0.770500 (ASP) | −0.585 | | | | |
| 13 | Stop45 | Plano | 0.821 | | | | |
| 14 | Lens 5 | −3.280700 (ASP) | 0.350 | Plastic | 1.535 | 56.3 | −1.81 |
| 15 | | 1.425850 (ASP) | 0.855 | | | | |
| 16 | IR-filter | Plano | 0.145 | Glass | 1.517 | 64.2 | — |
| 17 | | Plano | 0.527 | | | | |
| 18 | Image | Plano | — | | | | |

* Reference wavelength is 587.6 nm (d-line)
an effective radius of the stop 01 (YF) at surface 1 is 0.810 mm
an effective radius of the stop 12 (YF) at surface 4 is 0.875 mm
an effective radius of the stop 23 (YF) at surface 7 I s0.875 mm
an effective radius of the stop 34 (YR) at surface 10 is 1.160 mm
an effective radius of the stop 45 (YR) at surface 13 is 1.475 mm

TABLE 13

Aspheric Coefficients

| Surface # | 2 | 3 | 5 | 6 | 8 |
|---|---|---|---|---|---|
| k = | −6.27378E+00 | −5.00000E+01 | −2.00000E+01 | −6.56159E−01 | −4.64443E+00 |
| A4 = | 2.03368E−01 | −4.28890E−02 | 1.16103E−02 | 6.00484E−02 | −1.34227E−01 |
| A6 = | −1.81867E−01 | 7.27402E−03 | 2.45577E−02 | 1.06047E−02 | −1.61895E−01 |
| A8 = | 1.87690E−01 | −1.33616E−01 | −3.90666E−02 | 1.02386E−01 | 2.45441E−01 |
| A10 = | −1.89591E−01 | −3.57697E−02 | −4.01820E−01 | −3.76706E−01 | −2.54399E−01 |
| A12 = | 1.23558E−01 | 2.80516E−01 | 8.68558E−01 | 4.68421E−01 | 5.03023E−02 |
| A14 = | −6.30006E−02 | −1.84114E−01 | −4.54092E−01 | −1.41967E−01 | |

| Surface # | 9 | 11 | 12 | 14 | 15 |
|---|---|---|---|---|---|
| k = | −5.39004E−01 | 1.38391E+00 | −3.14329E+00 | −4.66230E+01 | −1.32600E+01 |
| A4 = | −9.89189E−02 | −5.76502E−02 | −1.59077E−01 | −3.97001E−03 | −5.99998E−02 |
| A6 = | −7.02371E−02 | 1.59198E−01 | 1.56940E−01 | −2.56104E−02 | 1.45555E−02 |
| A8 = | 9.61757E−02 | −1.65792E−01 | −8.43189E−02 | 9.43227E−03 | −4.32403E−03 |
| A10 = | −4.95296E−02 | 1.86402E−01 | 4.14531E−02 | −4.04448E−04 | 9.74873E−04 |
| A12 = | 1.76912E−02 | −9.96821E−02 | −1.09912E−02 | −1.85825E−04 | −1.43984E−04 |
| A14 = | | 1.97243E−02 | 7.70059E−04 | 1.77145E−05 | 1.01375E−05 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| f | 4.28 | YF/ImgH | | Stop 01 | 0.28 |
|---|---|---|---|---|---|
| Fno | 2.60 | | | Stop 12 | 0.25 |
| HFOV | 33.6 | | | Stop 23 | 0.27 |
| V1 − V2 − V3 | 8.3 | YR/ImgH | | Stop 34 | 0.38 |
| T12/T23 | 0.21 | | | Stop 45 | 0.51 |
| (R3 + R4)/(R3 − R4) | 0.71 | DR/ImgH | | Stop 34 | 0.61 |
| (R7 + R8)/(R7 − R8) | 2.11 | | | Stop 45 | 0.79 |
| f5/f1 | −0.65 | YR/DR | | Stop 34 | 0.62 |
| f/f3 | −0.14 | | | Stop 45 | 0.65 |
| (f/f4) − (f/f5) | 4.64 | TTL/ImgH | | | 1.72 |

Embodiment 6

Figure 6A:
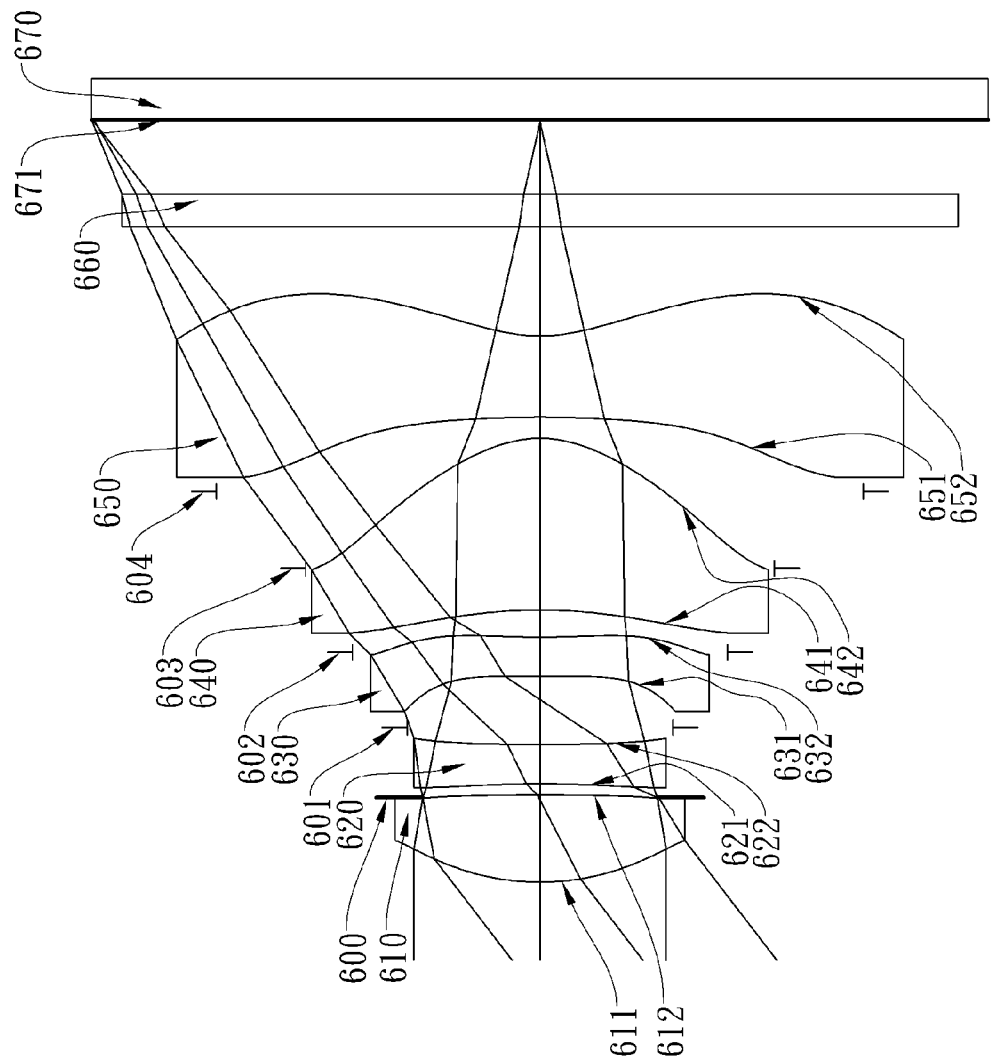
FIG. 6A shows an optical image capturing lens system in accordance with a sixth embodiment of the present invention.
Figure 6B:
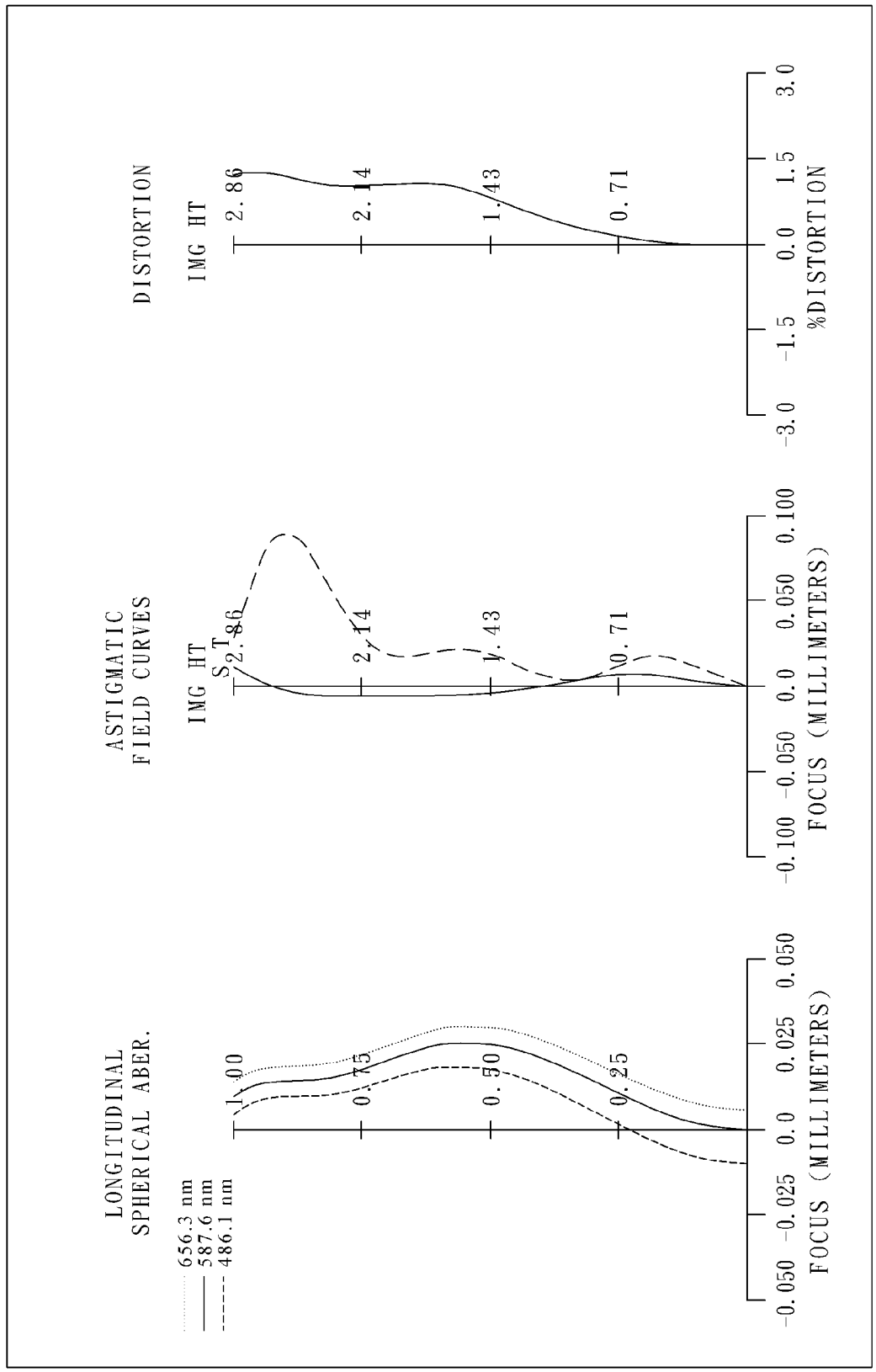
FIG. 6B shows the aberration curves of the sixth embodiment of the present invention.

FIG. 6A shows an optical image capturing lens system in accordance with the sixth embodiment of the present invention, and FIG. 6B shows the aberration curves of the sixth embodiment of the present invention. The optical image capturing lens system of the sixth embodiment of the present invention mainly comprises five lens elements, in order from an object side to an image side:

a first lens element 610 made of plastic with positive refractive power having a convex object-side surface 611 and a convex image-side surface 612, the object-side and image-side surfaces 611 and 612 thereof being aspheric;

a second lens element 620 made of plastic with negative refractive power having a concave object-side surface 621 and a concave image-side surface 622, the object-side and image-side surfaces 621 and 622 thereof being aspheric;

a third lens element 630 made of plastic with negative refractive power having a convex object-side surface 631 and a concave image-side surface 632, the object-side and image-side surfaces 631 and 632 thereof being aspheric;

a fourth lens element 640 made of plastic with positive refractive power having a concave object-side surface 641 and a convex image-side surface 642, the object-side and image-side surfaces 641 and 642 thereof being aspheric; and a fifth lens element 650 made of plastic with negative refractive power having a concave object-side surface 651 and a concave image-side surface 652, the object-side and image-side surfaces 651 and 652 thereof being aspheric, and at least one inflection point is formed on both the object-side surface 651 and the image-side surface 652 thereof;

wherein the optical image capturing lens system also comprises two front stops 600 (stop 12), 601 (stop 23), which are positioned between the first lens element 610 and the second lens element 620, and the second lens element 620 and the third lens element 630; wherein the front stop 600 (stop 12) is an aperture stop;

wherein the optical image capturing lens system also comprises three rear stops 602 (stop 34), 603 (stop 45A), 604 (stop 45B), which are positioned between the third lens element 630 and the fourth lens element 640, the fourth lens element 640 and the fifth lens element 650, and the fourth lens element 640 and the fifth lens element 650;

the optical image capturing lens system further comprises an IR filter 660 disposed between the image-side surface 652 of the fifth lens element 650 and an image plane 671, and the IR filter 660 is made of glass and has no influence on the focal length of the optical image capturing lens system; the optical image capturing lens system further comprises an image sensor 670 provided on the image plane 671.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 15

(Embodiment 6)
f = 3.66 mm, Fno = 2.25, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.582010 (ASP) | 0.558 | Plastic | 1.544 | 55.9 | 2.79 |
| 2 | | −34.020500 (ASP) | −0.016 | | | | |

TABLE 15-continued (Embodiment 6)
f = 3.66 mm, Fno = 2.25, HFOV = 37.5 deg.

| Surface # | | Curvature Radius | Thickness | Material | Index | Abbe # | Focal length |
|---|---|---|---|---|---|---|---|
| 3 | Stop12 (Ape. Stop) | Plano | 0.088 | | | | |
| 4 | Lens 2 | −6.826700 (ASP) | 0.250 | Plastic | 1.634 | 23.8 | −6.83 |
| 5 | | 12.022000 (ASP) | 0.113 | | | | |
| 6 | Stop23 | Plano | 0.325 | | | | |
| 7 | Lens 3 | 17.422400 (ASP) | 0.251 | Plastic | 1.634 | 23.8 | −11.67 |
| 8 | | 5.163100 (ASP) | −0.097 | | | | |
| 9 | Stop34 | Plano | 0.272 | | | | |
| 10 | Lens 4 | −3.123400 (ASP) | 1.100 | Plastic | 1.544 | 55.9 | 1.48 |
| 11 | | −0.720170 (ASP) | −0.832 | | | | |
| 12 | Stop45A | Plano | 0.490 | | | | |
| 13 | Stop45B | Plano | 0.477 | | | | |
| 14 | Lens 5 | −7.078000 (ASP) | 0.520 | Plastic | 1.535 | 56.3 | −1.54 |
| 15 | | 0.952100 (ASP) | 0.700 | | | | |
| 16 | IR-filter | Plano | 0.210 | Glass | 1.517 | 64.2 | — |
| 17 | | Plano | 0.475 | | | | |
| 18 | Image | Plano | — | | | | |

* Reference wavelength is 587.6 nm (d-line)
an effective radius of the stop 12 (YF) at surface 3 is 0.750 mm
an effective radius of the stop 23 (YF) at surface 6 is 0.850 mm
an effective radius of the stop 34 (YR) at surface 9 is 1.200 mm
an effective radius of the stop 45A (YR) at surface 12 is 1.500 mm
an effective radius of the stop 45B (YR) at surface 13 is 2.070 mm

TABLE 16

Aspheric Coefficients

| Surface # | 1 | 2 | 4 | 5 | 7 |
|---|---|---|---|---|---|
| k = | −7.41590E+00 | −5.00000E+01 | 6.55720E−01 | −1.00000E+02 | −1.00000E+00 |
| A4 = | 2.24196E−01 | −2.76654E−02 | 2.49843E−02 | 1.94925E−01 | −3.48565E−01 |
| A6 = | −2.10766E−01 | 3.79862E−02 | 2.98906E−02 | 5.60114E−05 | −2.00460E−01 |
| A8 = | 2.03709E−01 | −2.01048E−01 | 2.54239E−01 | 1.97828E−01 | 2.78118E−01 |
| A10 = | −1.63913E−01 | 4.01105E−01 | −9.69420E−02 | −4.81248E−01 | −4.80653E−01 |
| A12 = | 3.53173E−02 | −5.65373E−01 | 1.42280E+00 | 4.59258E−01 | 3.49891E−01 |
| A14 = | −2.11641E−02 | 3.19794E−01 | −7.00817E−01 | −1.09285E−01 | |

| Surface # | 8 | 10 | 11 | 14 | 15 |
|---|---|---|---|---|---|
| k = | −4.01629E+01 | 4.63230E+00 | −3.30281E+00 | −2.00000E+02 | −7.71612E+00 |
| A4 = | −1.79262E−01 | 4.87952E−02 | −1.79299E−01 | −2.31404E−02 | −5.87909E−02 |
| A6 = | −9.24211E−02 | 8.22267E−02 | 1.64501E−01 | −2.72262E−02 | 1.96166E−02 |
| A8 = | 1.40353E−01 | −2.18564E−01 | −1.34551E−01 | 1.23435E−02 | −7.20000E−03 |
| A10 = | −5.22881E−02 | 2.92240E−01 | 7.02856E−02 | −9.92883E−04 | 1.69827E−03 |
| A12 = | 1.83068E−02 | −1.70585E−01 | −1.43067E−02 | −1.59757E−04 | −2.14918E−04 |
| A14 = | | 3.77213E−02 | 5.27624E−04 | 2.07976E−05 | 1.11382E−05 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

(Embodiment 6)

| f | 3.66 | YF/ImgH | Stop 01 | — |
|---|---|---|---|---|
| Fno | 2.25 | | Stop 12 | 0.26 |
| HFOV | 37.5 | | Stop 23 | 0.29 |
| V1 − V2 − V3 | 8.3 | YR/ImgH | Stop 34 | 0.38 |
| T12/T23 | 0.16 | | Stop 45 | A: 0.51, B: 0.64 |
| (R3 + R4)/(R3 − R4) | −0.28 | DR/ImgH | Stop 34 | 0.52 |
| (R7 + R8)/(R7 − R8) | 1.60 | | Stop 45 | A: 0.70, B: 0.88 |
| f5/f1 | −0.55 | YR/DR | Stop 34 | 0.75 |
| f/f3 | −0.31 | | Stop 45 | A: 0.73, B: 0.73 |
| (f/f4) − (f/f5) | 4.86 | TTL/ImgH | | 1.69 |

Embodiment 7

Figure 7A:
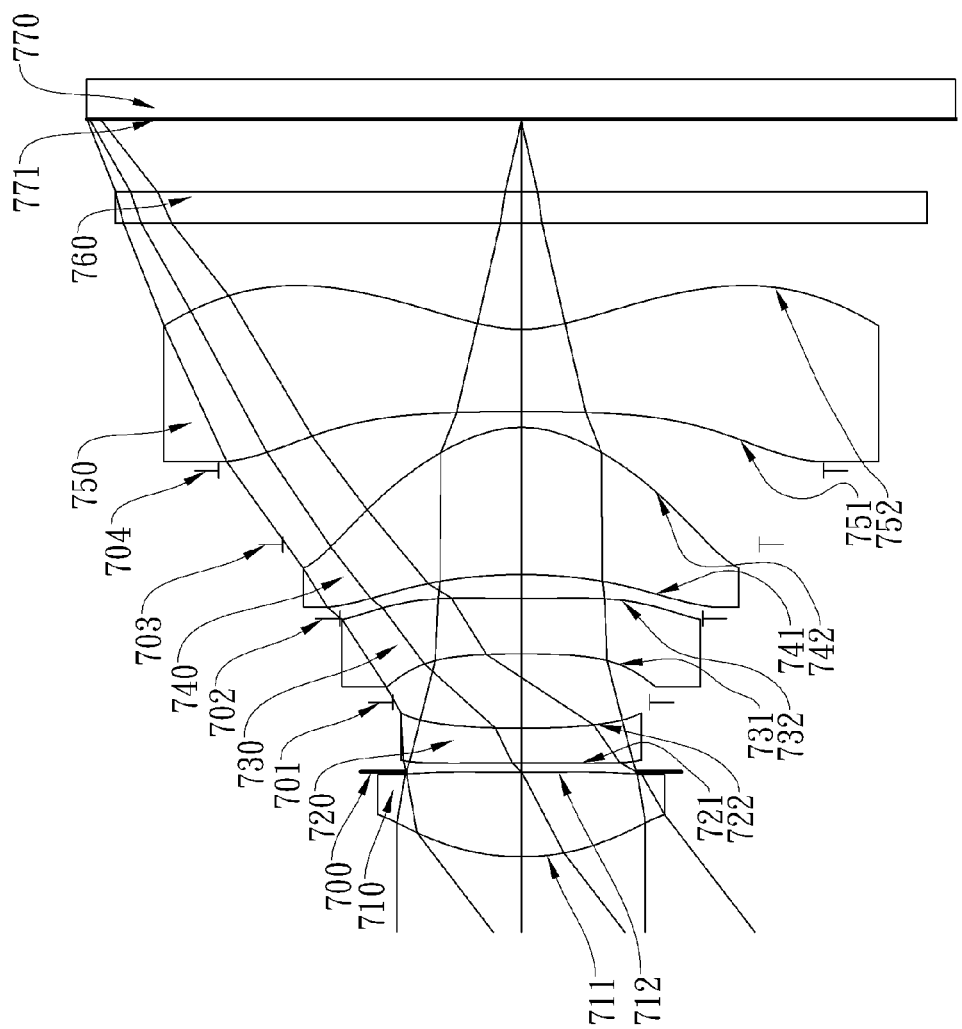
FIG. 7A shows an optical image capturing lens system in accordance with a seventh embodiment of the present invention.
Figure 7B:
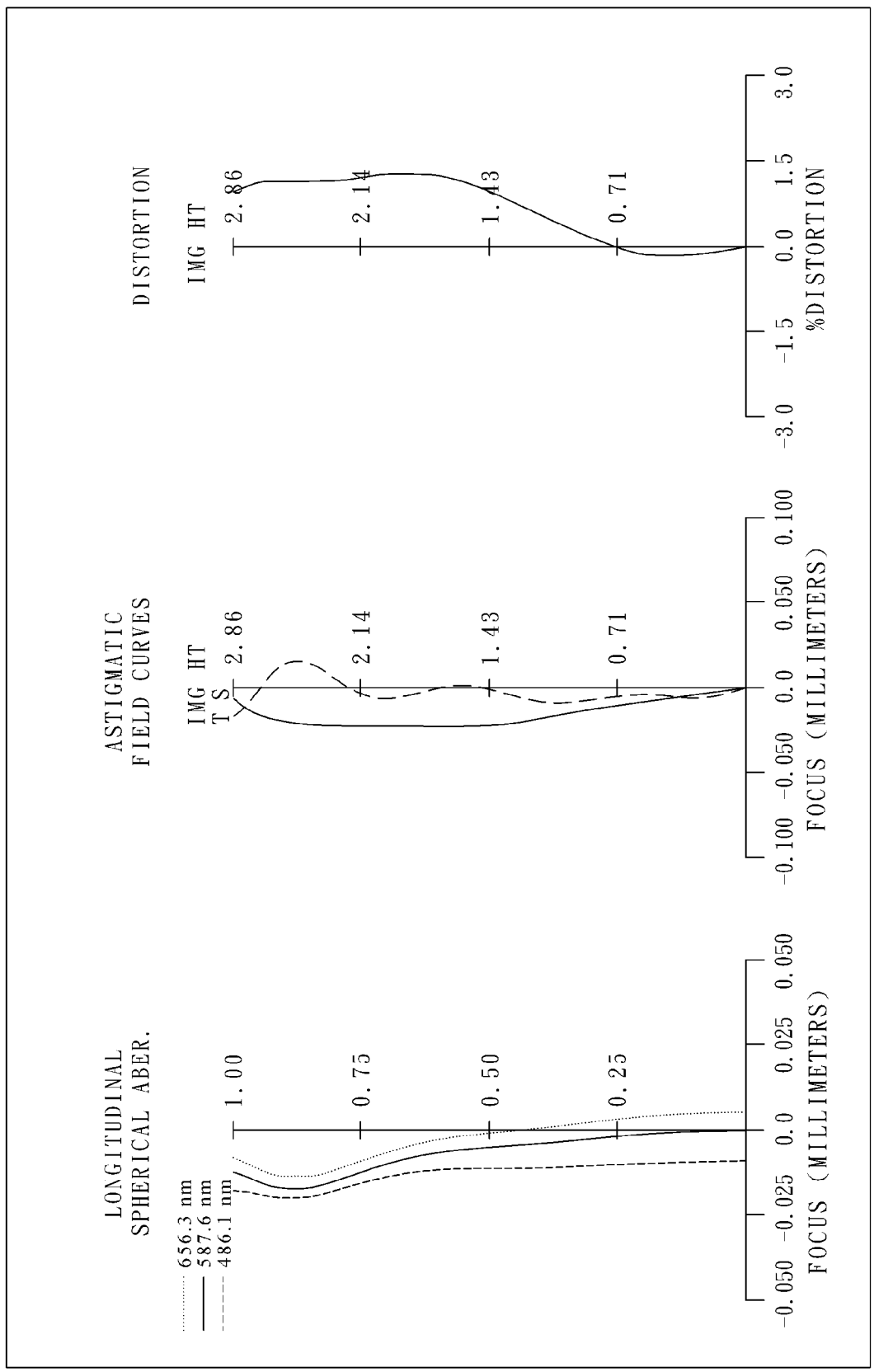
FIG. 7B shows the aberration curves of the seventh embodiment of the present invention.

FIG. 7A shows an optical image capturing lens system in accordance with the seventh embodiment of the present invention, and FIG. 7B shows the aberration curves of the seventh embodiment of the present invention. The optical image capturing lens system of the seventh embodiment of the present invention mainly comprises five lens elements, in order from an object side to an image side:

a first lens element 710 made of plastic with positive refractive power having a convex object-side surface 711 and a concave image-side surface 712, the object-side and image-side surfaces 711 and 712 thereof being aspheric;

a second lens element 720 made of plastic with negative refractive power having a concave object-side surface 721 and a concave image-side surface 722, the object-side and image-side surfaces 721 and 722 thereof being aspheric;

a third lens element 730 made of plastic with negative refractive power having a concave object-side surface 731 and a concave image-side surface 732, the object-side and image-side surfaces 731 and 732 thereof being aspheric;

a fourth lens element 740 made of plastic with positive refractive power having a concave object-side surface 741 and a convex image-side surface 742, the object-side and image-side surfaces 741 and 742 thereof being aspheric; and a fifth lens element 750 made of plastic with negative refractive power having a concave object-side surface 751 and a concave image-side surface 752, the object-side and image-side surfaces 751 and 752 thereof being aspheric, and at least one inflection point is formed on both the object-side surface 751 and the image-side surface 752 thereof;

wherein the optical image capturing lens system also comprises two front stops 700 (stop 12), 701 (stop 23), which are positioned between the first lens element 710 and the second lens element 720, and the second lens element 720 and the third lens element 730; wherein the front stop 700 (stop 12) is an aperture stop;

wherein the optical image capturing lens system also comprises three rear stops 702 (stop 34), 703 (stop 45A), 704 (stop 45B), which are positioned between the third lens element 730 and the fourth lens element 740, the fourth lens element 740 and the fifth lens element 750, and the fourth lens element 740 and the fifth lens element 750;

the optical image capturing lens system further comprises an IR filter 760 disposed between the image-side surface 752 of the fifth lens element 750 and an image plane 771, and the IR filter 760 is made of glass and has no influence on the focal length of the optical image capturing lens system; the optical image capturing lens system further comprises an image sensor 770 provided on the image plane 771.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
f = 3.70 mm, Fno = 2.25, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.531350 (ASP) | 0.559 | Plastic | 1.544 | 55.9 | 2.97 |
| 2 | | 25.886600 (ASP) | 0.004 | | | | |
| 3 | Stop12 (Ape. Stop) | Plano | 0.057 | | | | |
| 4 | Lens 2 | −100.000000 (ASP) | 0.230 | Plastic | 1.640 | 23.3 | −8.17 |
| 5 | | 5.520000 (ASP) | 0.174 | | | | |
| 6 | Stop23 | Plano | 0.319 | | | | |
| 7 | Lens 3 | −10.177400 (ASP) | 0.367 | Plastic | 1.640 | 23.3 | −8.54 |
| 8 | | 11.949400 (ASP) | −0.132 | | | | |
| 9 | Stop34 | Plano | 0.291 | | | | |
| 10 | Lens 4 | −3.507100 (ASP) | 0.975 | Plastic | 1.544 | 55.9 | 1.55 |
| 11 | | −0.745180 (ASP) | −0.776 | | | | |
| 12 | Stop45A | Plano | 0.490 | | | | |
| 13 | Stop45B | Plano | 0.390 | | | | |
| 14 | Lens 5 | −17.098100 (ASP) | 0.546 | Plastic | 1.535 | 56.3 | −1.69 |
| 15 | | 0.963430 (ASP) | 0.700 | | | | |
| 16 | IR-filter | Plano | 0.210 | Glass | 1.517 | 64.2 | — |
| 17 | | Plano | 0.481 | | | | |
| 18 | Image | Plano | — | | | | |

\* Reference wavelength is 587.6 nm (d-line)
an effective radius of the stop 12 (YF) at surface 3 is 0.762 mm
an effective radius of the stop 23 (YF) at surface 6 is 0.850 mm
an effective radius of the stop 34 (YR) at surface 9 is 1.200 mm
an effective radius of the stop 45A (YR) at surface 12 is 1.575 mm
an effective radius of the stop 45B (YR) at surface 13 is 2.000 mm

TABLE 19

Aspheric Coefficients

| Surface # | 1 | 2 | 4 | 5 | 7 |
|---|---|---|---|---|---|
| k = | −6.47745E+00 | 9.00000E+01 | 9.00000E+01 | 8.33765E+00 | 1.10378E+01 |
| A4 = | 2.19345E−01 | −6.67340E−02 | −1.41910E−02 | 2.23247E−02 | −2.17124E−01 |
| A6 = | −1.96197E−01 | 4.80483E−03 | 4.02661E−02 | 5.41823E−02 | −2.62260E−01 |
| A8 = | 1.84797E−01 | −1.84225E−02 | 2.81143E−01 | 2.07552E−01 | 6.13446E−01 |
| A10 = | −1.99344E−01 | −6.03488E−02 | −5.57615E−01 | −4.04760E−01 | −9.80478E−01 |
| A12 = | 9.27057E−02 | 2.24736E−01 | 6.69383E−01 | 5.02901E−01 | 6.14746E−01 |
| A14 = | −4.49180E−02 | −2.05938E−01 | −2.88256E−01 | −1.11149E−01 | |

| Surface # | 8 | 10 | 11 | 14 | 15 |
|---|---|---|---|---|---|
| k = | −2.98595E+01 | 5.63325E+00 | −3.15342E+00 | 3.14405E+01 | −7.38948E+00 |
| A4 = | −1.47541E−01 | −3.60539E−02 | −1.80446E−01 | −1.25690E−02 | −5.42532E−02 |
| A6 = | −2.83837E−02 | 9.22171E−02 | 1.36599E−01 | −2.36257E−02 | 1.73468E−02 |
| A8 = | 6.67102E−02 | −1.76507E−01 | −1.10750E−01 | 9.80499E−03 | −5.99910E−03 |
| A10 = | −2.14260E−02 | 2.43177E−01 | 5.66854E−02 | −6.97103E−04 | 1.32391E−03 |
| A12 = | 4.48859E−03 | −1.43132E−01 | −1.25499E−02 | −1.35387E−04 | −1.56745E−04 |
| A14 = | | 3.13783E−02 | 1.16121E−03 | 1.66192E−05 | 7.65567E−06 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| | | | |
|---|---|---|---|
| f | 3.70 | YF/ImgH Stop 01 | — |
| Fno | 2.25 | Stop 12 | 0.27 |
| HFOV | 37.5 | Stop 23 | 0.29 |
| V1 − V2 − V3 | 9.3 | YR/ImgH Stop 34 | 0.42 |
| T12/T23 | 0.12 | Stop 45 | A: 0.54, B: 0.67 |
| (R3 + R4)/(R3 − R4) | 0.90 | DR/ImgH Stop 34 | 0.55 |
| (R7 + R8)/(R7 − R8) | 1.54 | Stop 45 | A: 0.72, B: 0.90 |
| f5/f1 | −0.57 | YR/DR Stop 34 | 0.76 |
| f/f3 | −0.43 | Stop 45 | A: 0.75, B: 0.75 |
| (f/f4) − (f/f5) | 4.58 | TTL/ImgH | 1.69 |

Embodiment 8

Figure 8A:
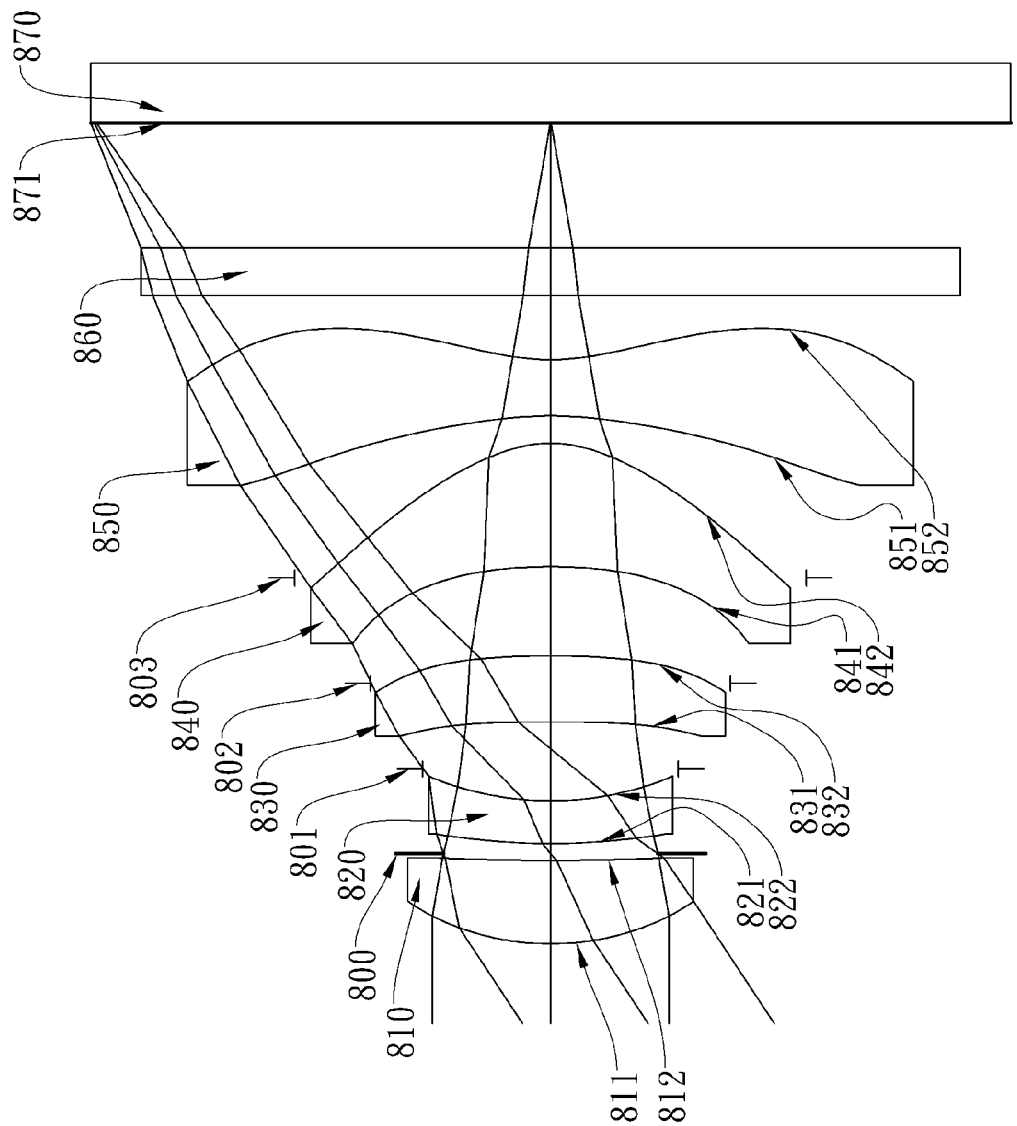
FIG. 8A shows an optical image capturing lens system in accordance with an eighth embodiment of the present invention.
Figure 8B:
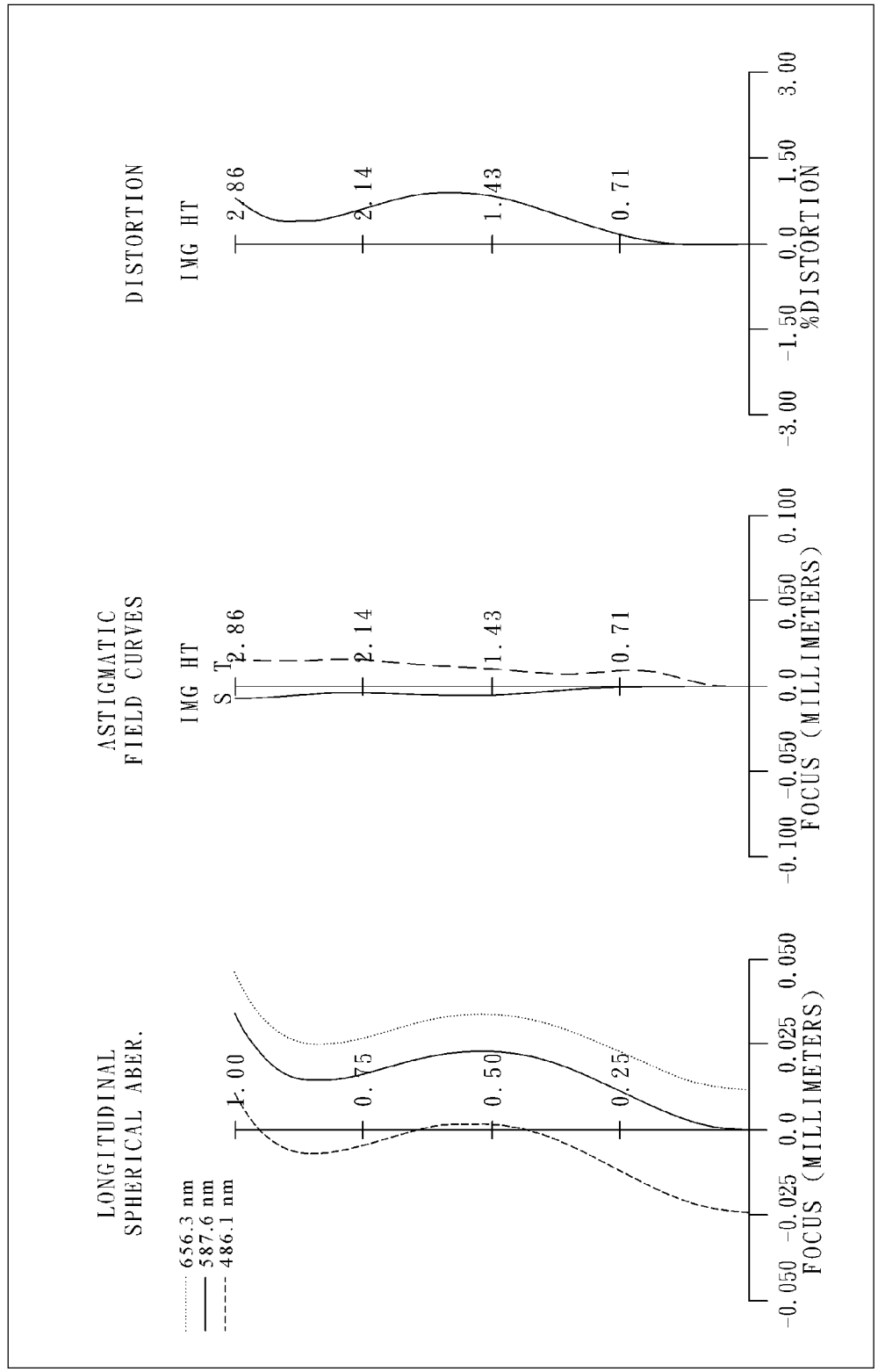
FIG. 8B shows the aberration curves of the eighth embodiment of the present invention.

FIG. 8A shows an optical image capturing lens system in accordance with the eighth embodiment of the present invention, and FIG. 8B shows the aberration curves of the eighth embodiment of the present invention. The optical image capturing lens system of the eighth embodiment of the present invention mainly comprises five lens elements, in order from an object side to an image side:

a first lens element 810 made of plastic with positive refractive power having a convex object-side surface 811 and a concave image-side surface 812, the object-side and image-side surfaces 811 and 812 thereof being aspheric;

a second lens element 820 made of plastic with negative refractive power having a convex object-side surface 821 and a concave image-side surface 822, the object-side and image-side surfaces 821 and 822 thereof being aspheric;

a third lens element 830 made of plastic with positive refractive power having a concave object-side surface 831 and a convex image-side surface 832, the object-side and image-side surfaces 831 and 832 thereof being aspheric;

a fourth lens element 840 made of plastic with positive refractive power having a concave object-side surface 841 and a convex image-side surface 842, the object-side and image-side surfaces 841 and 842 thereof being aspheric; and a fifth lens element 850 made of plastic with negative refractive power having a concave object-side surface 851 and a concave image-side surface 852, the object-side and image-side surfaces 851 and 852 thereof being aspheric, and at least one inflection point is formed on both the object-side surface 851 and the image-side surface 852 thereof;

wherein the optical image capturing lens system also comprises two front stops 800 (stop 12), 801 (stop 23), which are positioned between the first lens element 810 and the second lens element 820, and the second lens element 820 and the third lens element 830; wherein the front stop 800 (stop 12) is an aperture stop;

wherein the optical image capturing lens system also comprises two rear stops 802 (stop 34), 803 (stop 45), which are positioned between the third lens element 830 and the fourth lens element 840, and the fourth lens element 840 and the fifth lens element 850;

the optical image capturing lens system further comprises an IR filter 860 disposed between the image-side surface 852 of the fifth lens element 850 and an image plane 871, and the IR filter 860 is made of glass and has no influence on the focal length of the optical image capturing lens system; the optical image capturing lens system further comprises an image sensor 870 provided on the image plane 871.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

(Embodiment 8)
f = 4.28 mm, Fno = 2.85, HFOV = 33.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.690600 (ASP) | 0.521 | Plastic | 1.544 | 55.9 | 3.50 |
| 2 | | 13.541600 (ASP) | 0.044 | | | | |
| 3 | Stop12 (Ape. Stop) | Plano | 0.061 | | | | |
| 4 | Lens 2 | 3.335500 (ASP) | 0.268 | Plastic | 1.634 | 23.8 | −6.78 |
| 5 | | 1.819870 (ASP) | 0.201 | | | | |
| 6 | Stop23 | Plano | 0.293 | | | | |
| 7 | Lens 3 | −17.432600 (ASP) | 0.414 | Plastic | 1.544 | 55.9 | 19.47 |
| 8 | | −6.645400 (ASP) | −0.172 | | | | |
| 9 | Stop34 | Plano | 0.730 | | | | |
| 10 | Lens 4 | −3.481500 (ASP) | 0.773 | Plastic | 1.544 | 55.9 | 1.63 |
| 11 | | −0.763940 (ASP) | −0.843 | | | | |
| 12 | Stop45 | Plano | 1.015 | | | | |
| 13 | Lens 5 | −2.232080 (ASP) | 0.351 | Plastic | 1.544 | 55.9 | −1.45 |
| 14 | | 1.291100 (ASP) | 0.400 | | | | |
| 15 | IR-filter | Plano | 0.300 | Glass | 1.517 | 64.2 | — |
| 16 | | Plano | 0.782 | | | | |
| 17 | Image | Plano | — | | | | |

* Reference wavelength is 587.6 nm (d-line)

an effective radius of the stop 12 (YF) at surface 3 is 0.670 mm an effective radius of the stop 23 (YF) at surface 6 is 0.800 mm an effective radius of the stop 34 (YR) at surface 9 is 1.125 mm an effective radius of the stop 45 (YR) at surface 12 is 1.600 mm

TABLE 22

Aspheric Coefficients

| Surface # | 1 | 2 | 4 | 5 | 7 |
|---|---|---|---|---|---|
| k = | 1.01969E+00 | −7.43546E+00 | 1.19610E+01 | 2.61889E+00 | 2.53078E+02 |
| A4 = | −2.77284E−02 | −6.77401E−02 | −2.12772E−01 | −1.70066E−01 | −8.71528E−02 |
| A6 = | 1.42037E−02 | 2.05987E−01 | 3.29725E−01 | 1.69138E−01 | 1.61808E−02 |
| A8 = | −4.82460E−02 | −3.16543E−01 | −5.37759E−01 | −2.34664E−01 | −1.22079E−02 |
| A10 = | 3.90653E−02 | 3.90403E−01 | 6.67581E−01 | 2.13110E−01 | 2.07558E−02 |
| A12 = | −4.83806E−03 | −2.19081E−01 | −6.24181E−01 | −2.20657E−01 | −1.96562E−02 |
| A14 = | −8.34533E−04 | 5.63344E−02 | 2.11322E−01 | 5.88417E−02 | 2.08425E−02 |

| Surface # | 8 | 10 | 11 | 13 | 14 |
|---|---|---|---|---|---|
| k = | 8.19022E−01 | −2.06660E+01 | −3.56868E+00 | −2.83365E+01 | −1.13432E+01 |
| A4 = | −9.77433E−02 | −1.95459E−01 | −1.35173E−01 | −1.71159E−02 | −4.47457E−02 |
| A6 = | 3.18097E−02 | 1.12176E−01 | 7.93060E−02 | −3.26247E−03 | 7.30888E−03 |
| A8 = | −4.72988E−02 | −5.58088E−02 | −2.53671E−02 | 2.17227E−03 | −1.27973E−03 |
| A10 = | 1.97705E−02 | 5.44538E−03 | 3.41726E−03 | −1.81901E−04 | 9.77894E−05 |
| A12 = | −4.50365E−03 | 9.41714E−05 | 1.69566E−04 | −1.34080E−05 | 4.58530E−07 |
| A14 = | 2.94169E−03 | −5.36539E−04 | −2.44271E−05 | 1.70785E−06 | −2.07833E−08 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f | 4.28 | YF/ImgH | Stop 01 | — |
|---|---|---|---|---|
| Fno | 2.85 | | Stop 12 | 0.23 |
| HFOV | 33.4 | | Stop 23 | 0.28 |
| V1 − V2 − V3 | −23.8 | YR/ImgH | Stop 34 | 0.39 |
| T12/T23 | 0.21 | | Stop 45 | 0.54 |
| (R3 + R4)/(R3 − R4) | 3.40 | DR/ImgH | Stop 34 | 0.57 |
| (R7 + R8)/(R7 − R8) | 1.56 | | Stop 45 | 0.80 |
| f5/f1 | −0.42 | YR/DR | Stop 34 | 0.69 |
| f/f3 | 0.22 | | Stop 45 | 0.67 |
| (f/f4) − (f/f5) | 5.56 | TTL/ImgH | | 1.76 |

Embodiment 9

Figure 9A:
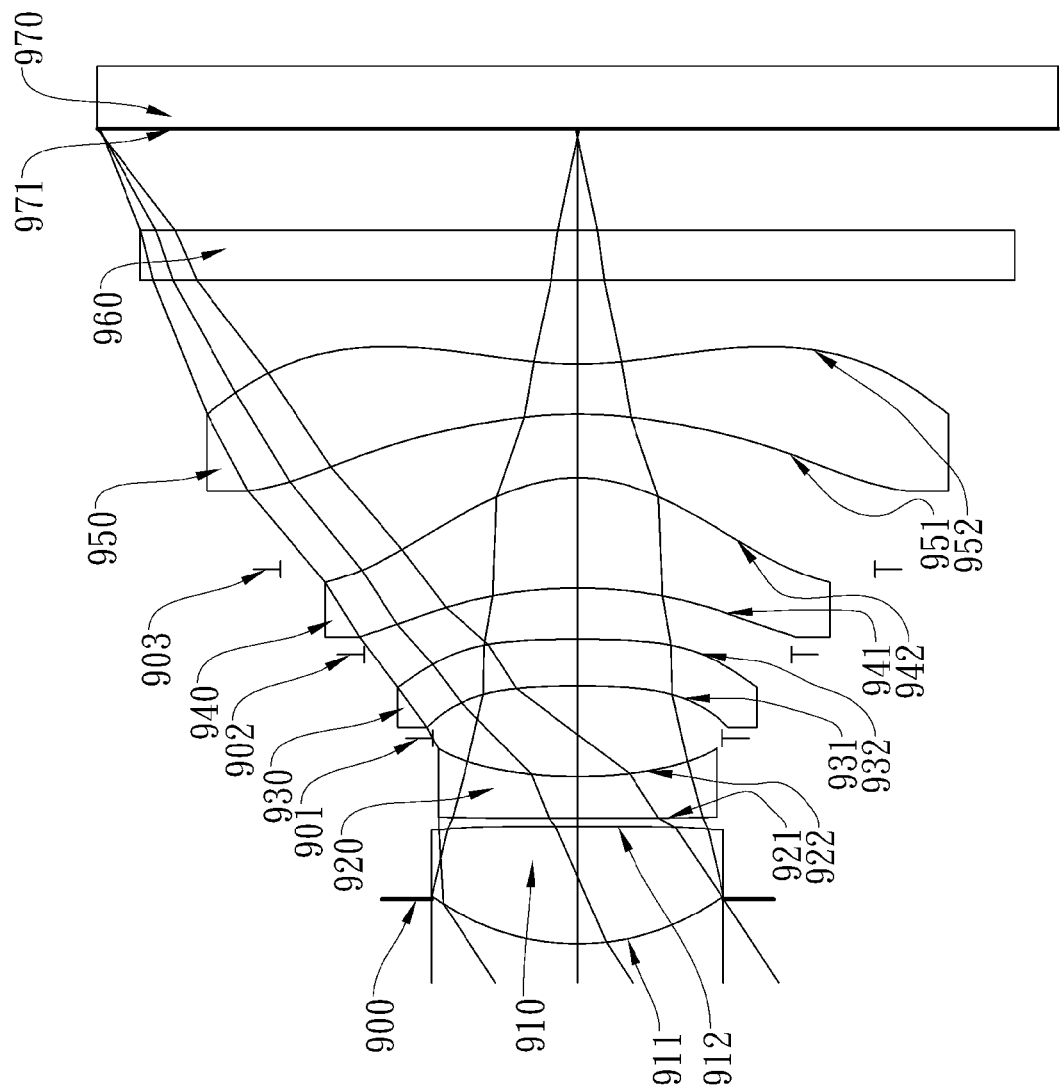
FIG. 9A shows an optical image capturing lens system in accordance with a ninth embodiment of the present invention.
Figure 9B:
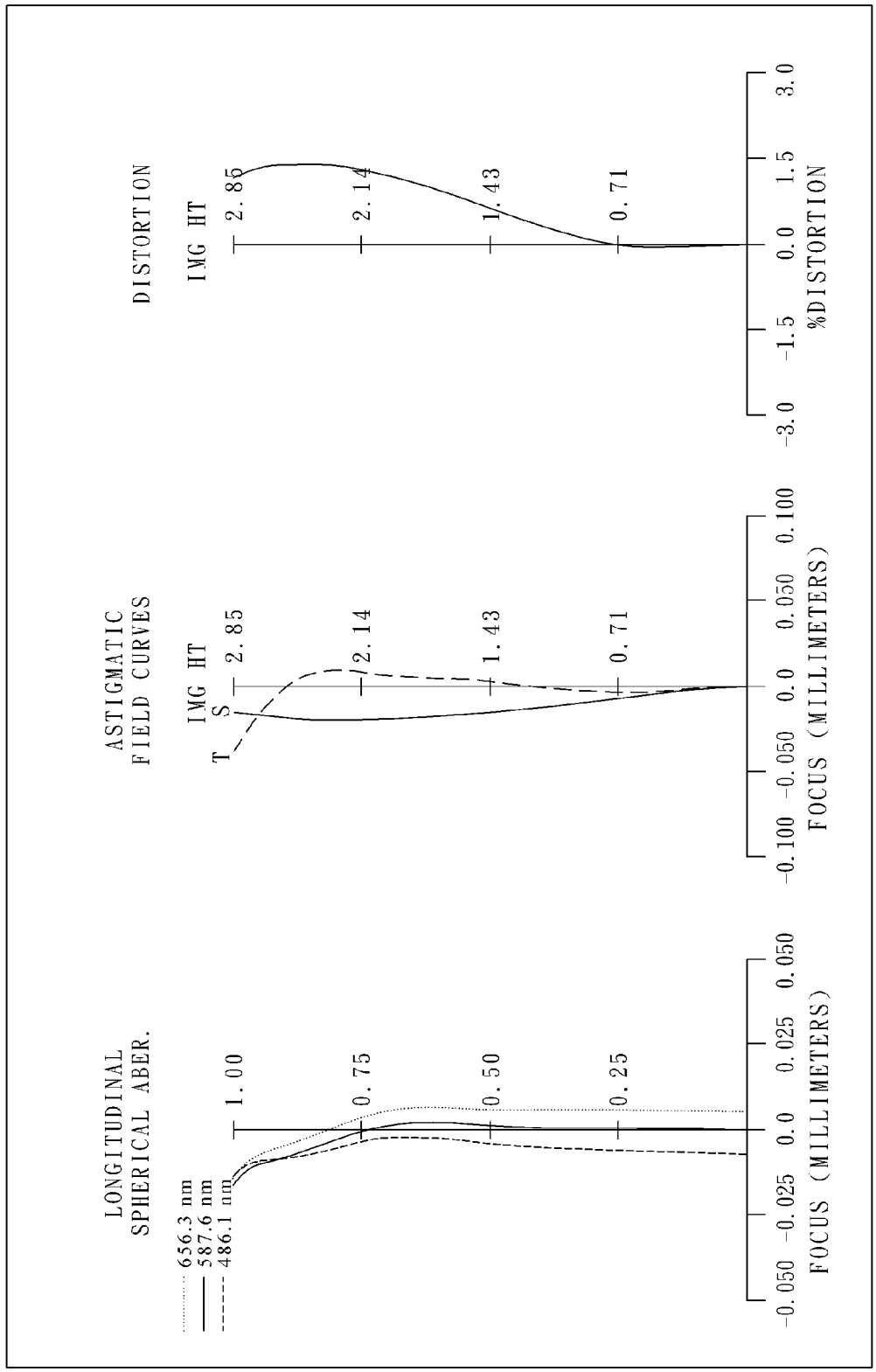
FIG. 9B shows the aberration curves of the ninth embodiment of the present invention.

FIG. 9A shows an optical image capturing lens system in accordance with the ninth embodiment of the present invention, and FIG. 9B shows the aberration curves of the ninth embodiment of the present invention. The optical image capturing lens system of the ninth embodiment of the present invention mainly comprises five lens elements, in order from an object side to an image side:

a first lens element 910 made of plastic with positive refractive power having a convex object-side surface 911 and a convex image-side surface 912, the object-side and image-side surfaces 911 and 912 thereof being aspheric;

a second lens element 920 made of plastic with negative refractive power having a convex object-side surface 921 and a concave image-side surface 922, the object-side and image-side surfaces 921 and 922 thereof being aspheric;

a third lens element 930 made of plastic with negative refractive power having a concave object-side surface 931 and a convex image-side surface 932, the object-side and image-side surfaces 931 and 932 thereof being aspheric;

a fourth lens element 940 made of plastic with positive refractive power having a concave object-side surface 941 and a convex image-side surface 942, the object-side and image-side surfaces 941 and 942 thereof being aspheric; and a fifth lens element 950 made of plastic with negative refractive power having a concave object-side surface 951 and a concave image-side surface 952, the object-side and image-side surfaces 951 and 952 thereof being aspheric, and at least one inflection point is formed on both the object-side surface 951 and the image-side surface 952 thereof;

wherein the optical image capturing lens system also comprises two front stops 900 (stop 01), 901 (stop 23), which are positioned between the imaged object and the first lens element 910, and the second lens element 920 and the third lens element 930; wherein the front stop 900 (stop 01) is an aperture stop;

wherein the optical image capturing lens system also comprises two rear stops 902 (stop 34), 903 (stop 45), which are positioned between the third lens element 930 and the fourth lens element 940, and the fourth lens element 940 and the fifth lens element 950;

the optical image capturing lens system further comprises an IR filter 960 disposed between the image-side surface 952 of the fifth lens element 950 and an image plane 971, and the IR filter 960 is made of glass and has no influence on the focal length of the optical image capturing lens system; the optical image capturing lens system further comprises an image sensor 970 provided on the image plane 971.

The detailed optical data of the ninth embodiment is shown in TABLE 24, and the aspheric surface data is shown in TABLE 25, wherein the units of the radius of curvature, the thickness and the focal length are expressed in mm, and HFOV is half of the maximal field of view.

TABLE 24

(Embodiment 9)
f = 4.29 mm, Fno = 2.46, HFOV = 33.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Stop01 (Ape. Stop) | Plano | −0.270 | | | | |

TABLE 24-continued (Embodiment 9)
f = 4.29 mm, Fno = 2.46, HFOV = 33.4 deg.

| Surface # | | Curvature Radius | Thickness | Material | Index | Abbe # | Focal length |
|---|---|---|---|---|---|---|---|
| 2 | Lens 1 | 1.451340 (ASP) | 0.703 | Plastic | 1.544 | 55.9 | 2.61 |
| 3 | | −50.704900 (ASP) | 0.047 | | | | |
| 4 | Lens 2 | 90.676500 (ASP) | 0.250 | Plastic | 1.634 | 23.8 | −4.51 |
| 5 | | 2.768220 (ASP) | 0.230 | | | | |
| 6 | Stop23 | Plano | 0.311 | | | | |
| 7 | Lens 3 | −6.391700 (ASP) | 0.280 | Plastic | 1.634 | 23.8 | −29.62 |
| 8 | | −9.854800 (ASP) | −0.091 | | | | |
| 9 | Stop34 | Plano | 0.396 | | | | |
| 10 | Lens 4 | −2.839550 (ASP) | 0.661 | Plastic | 1.544 | 55.9 | 2.26 |
| 11 | | −0.927110 (ASP) | −0.547 | | | | |
| 12 | Stop45 | Plano | 0.925 | | | | |
| 13 | Lens 5 | −2.458060 (ASP) | 0.300 | Plastic | 1.544 | 55.9 | −2.10 |
| 14 | | 2.230540 (ASP) | 0.500 | | | | |
| 15 | IR-filter | Plano | 0.300 | Glass | 1.517 | 64.2 | — |
| 16 | | Plano | 0.606 | | | | |
| 17 | Image | Plano | — | | | | |

\* Reference wavelength is 587.6 nm (d-line)
an effective radius of the stop 01 (YF) at surface 1 is 0.871 mm
an effective radius of the stop 23 (YF) at surface 6 is 0.865 mm
an effective radius of the stop 34 (YR) at surface 9 is 1.275 mm
an effective radius of the stop 45 (YR) at surface 12 is 1.775 mm

TABLE 25

Aspheric Coefficients

| Surface # | 2 | 3 | 4 | 5 | 7 |
|---|---|---|---|---|---|
| k = | −5.63951E+00 | −3.00000E+01 | −3.00000E+01 | 5.67690E+00 | 2.99977E+01 |
| A4 = | 2.29899E−01 | −1.49884E−02 | −3.20546E−03 | −2.33239E−03 | −2.13800E−01 |
| A6 = | −1.68635E−01 | 6.36860E−02 | 3.36661E−02 | 1.96612E−01 | −1.25649E−01 |
| A8 = | 1.34342E−01 | −2.01816E−01 | 1.63926E−01 | 1.70431E−01 | 1.75347E−01 |
| A10 = | −3.14382E−02 | 2.28011E−01 | −6.64401E−01 | −4.03168E−01 | −1.33171E−01 |
| A12 = | −3.86596E−02 | −2.68477E−01 | 7.33740E−01 | 3.31341E−01 | 3.10600E−02 |
| A14 = | 8.16002E−03 | 1.40242E−01 | −2.58047E−01 | −1.53526E−02 | |

| Surface # | 8 | 10 | 11 | 13 | 15 |
|---|---|---|---|---|---|
| k = | 2.99927E+01 | 3.17394E+00 | −2.98722E+00 | −1.97138E+01 | −1.81237E+01 |
| A4 = | −1.75394E−01 | −1.14807E−02 | −8.55855E−02 | −3.30970E−02 | −5.30547E−02 |
| A6 = | −8.79564E−02 | 8.33152E−02 | 1.20363E−01 | −2.06539E−02 | 1.28739E−02 |
| A8 = | 1.02865E−01 | −1.73041E−01 | −8.74095E−02 | 8.30664E−03 | −4.03488E−03 |
| A10 = | −4.60945E−02 | 1.97993E−01 | 4.28499E−02 | −6.01740E−04 | 9.28144E−04 |
| A12 = | 2.44590E−02 | −9.48215E−02 | −9.97350E−03 | −1.21034E−04 | −1.33383E−04 |
| A14 = | | 1.70060E−02 | 6.73199E−04 | 1.50994E−05 | 8.66405E−06 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 23.

TABLE 26

(Embodiment 9)

| f | 4.29 | YF/ImgH | Stop 01 | 0.30 |
|---|---|---|---|---|
| Fno | 2.46 | | Stop 12 | — |
| HFOV | 33.4 | | Stop 23 | 0.30 |
| V1 − V2 − V3 | 8.3 | YR/ImgH | Stop 34 | 0.43 |
| T12/T23 | 0.09 | | Stop 45 | 0.55 |
| (R3 + R4)/(R3 − R4) | 1.06 | DR/ImgH | Stop 34 | 0.61 |
| (R7 + R8)/(R7 − R8) | 1.97 | | Stop 45 | 0.78 |
| f5/f1 | −0.81 | YR/DR | Stop 34 | 0.71 |
| f/f3 | −0.15 | | Stop 45 | 0.70 |
| (f/f4) − (f/f5) | 3.94 | TTL/ImgH | | 1.67 |

Embodiment 10

Figure 10A:
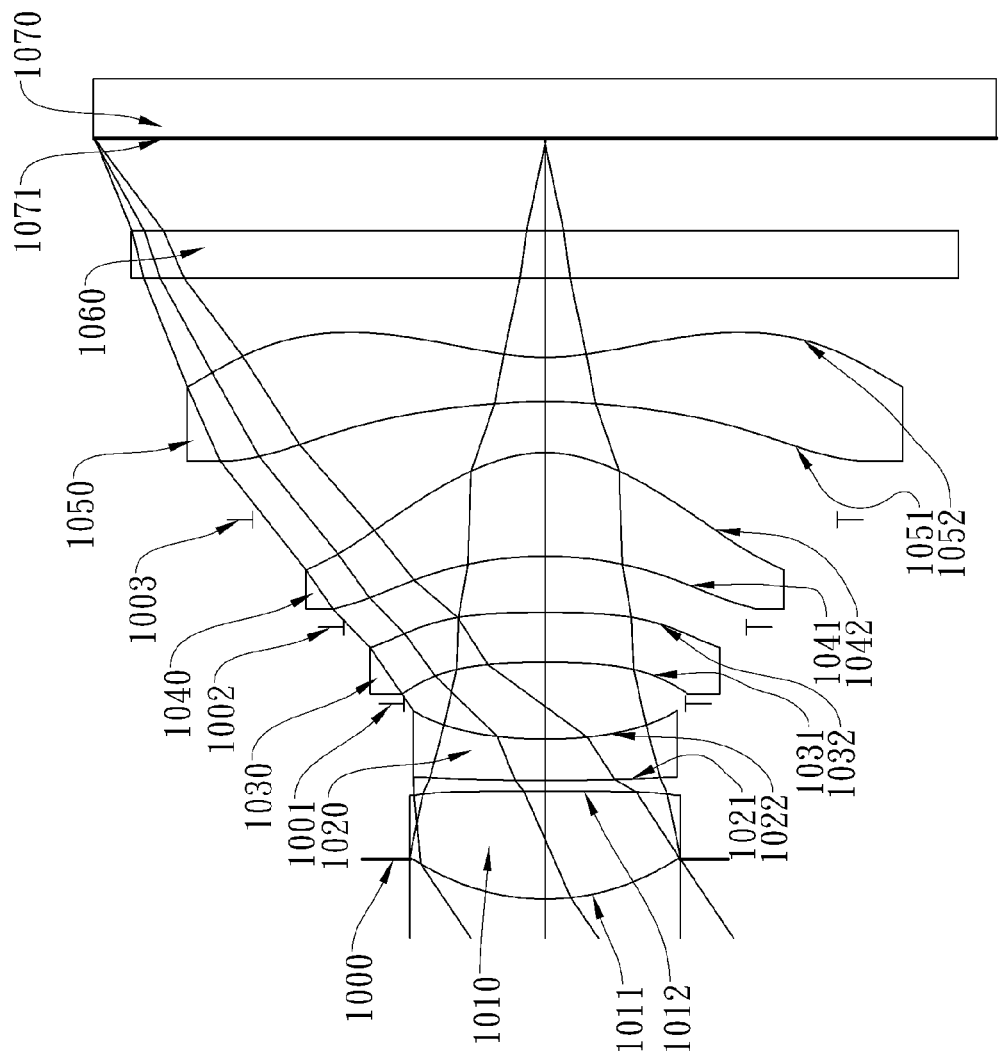
FIG. 10A shows an optical image capturing lens system in accordance with a tenth embodiment of the present invention.
Figure 10B:
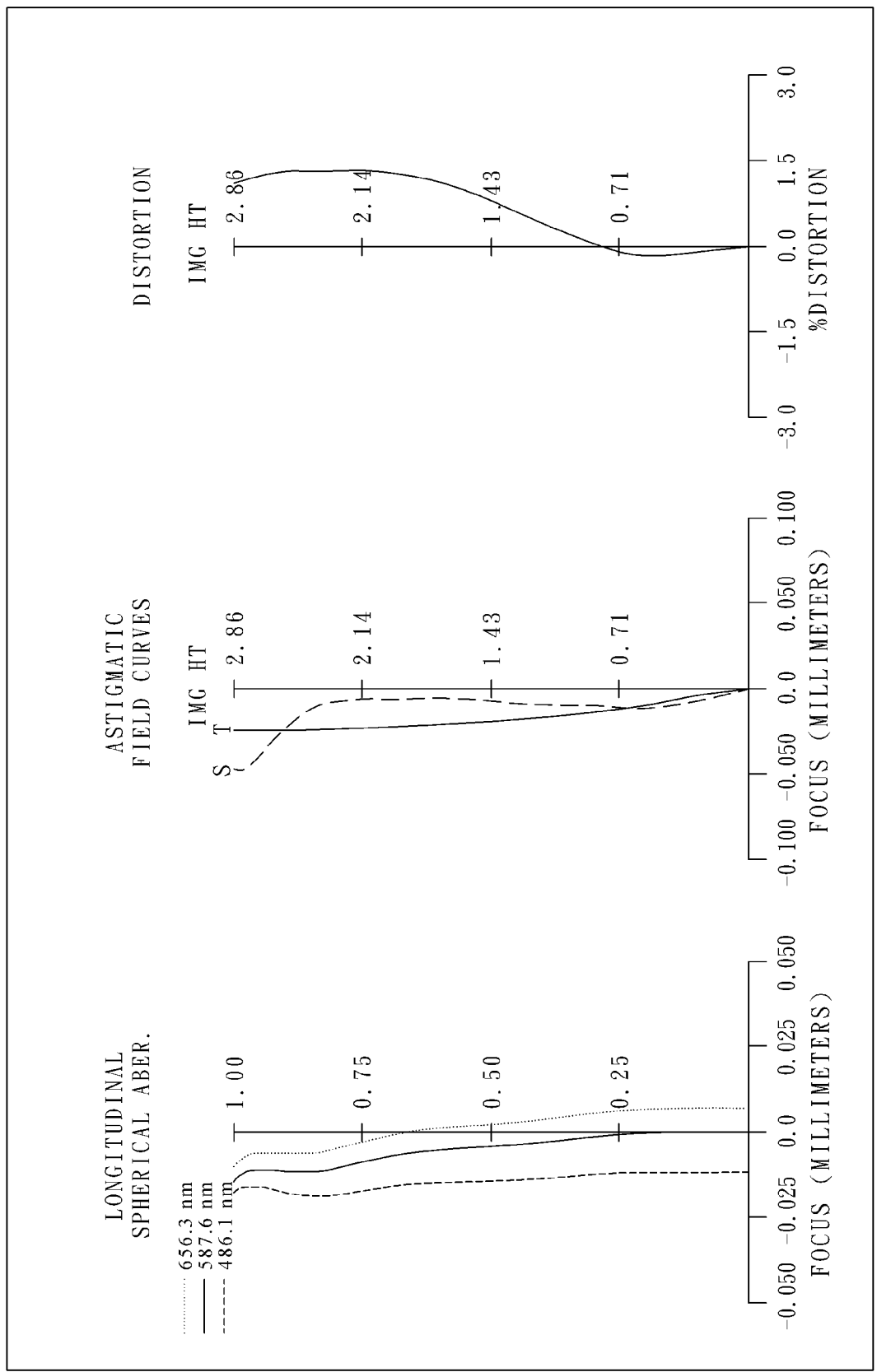
FIG. 10B shows the aberration curves of the tenth embodiment of the present invention.

FIG. 10A shows an optical image capturing lens system in accordance with the tenth embodiment of the present invention, and FIG. 10B shows the aberration curves of the tenth embodiment of the present invention. The optical image capturing lens system of the tenth embodiment of the present invention mainly comprises five lens elements, in order from an object side to an image side:

a first lens element 1010 made of plastic with positive refractive power having a convex object-side surface 1011 and a convex image-side surface 1012, the object-side and image-side surfaces 1011 and 1012 thereof being aspheric;

a second lens element 1020 made of plastic with negative refractive power having a convex object-side surface 1021 and a concave image-side surface 1022, the object-side and image-side surfaces 1021 and 1022 thereof being aspheric;

a third lens element 1030 made of plastic with negative refractive power having a concave object-side surface 1031 and a convex image-side surface 1032, the object-side and image-side surfaces 1031 and 1032 thereof being aspheric;

a fourth lens element 1040 made of plastic with positive refractive power having a concave object-side surface 1041 and a convex image-side surface 1042, the object-side and image-side surfaces 1041 and 1042 thereof being aspheric; and a fifth lens element 1050 made of plastic with negative refractive power having a concave object-side surface 1051 and a concave image-side surface 1052, the object-side and image-side surfaces 1051 and 1052 thereof being aspheric, and at least one inflection point is formed on both the object-side surface 1051 and the image-side surface 1052 thereof;

wherein the optical image capturing lens system also comprises two front stops 1000 (stop 01), 1001 (stop 23), which are positioned between an imaged object and the first lens element 1010, and the second lens element 1020 and the third lens element 1030; wherein the front stop 1000 (stop 01) is an aperture stop;

wherein the optical image capturing lens system also comprises two rear stops 1002 (stop 34), 1003 (stop 45), which are positioned between the third lens element 1030 and the fourth lens element 1040, and the fourth lens element 1040 and the fifth lens element 1050;

the optical image capturing lens system further comprises an IR filter 1060 disposed between the image-side surface 1052 of the fifth lens element 1050 and an image plane 1071, and the IR filter 1060 is made of glass and has no influence on the focal length of the optical image capturing lens system; the optical image capturing lens system further comprises an image sensor 1070 provided on the image plane 1071.

The detailed optical data of the tenth embodiment is shown in TABLE 27, and the aspheric surface data is shown in TABLE 28, wherein the units of the radius of curvature, the thickness and the focal length are expressed in mm, and HFOV is half of the maximal field of view.

TABLE 27

(Embodiment 10)
f = 4.20 mm, Fno = 2.45, HFOV = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Stop01 (Ape. Stop) | Plano | −0.252 | | | | |
| 2 | Lens 1 | 1.471910 (ASP) | 0.683 | Plastic | 1.544 | 55.9 | 2.66 |
| 3 | | −80.730500 (ASP) | 0.068 | | | | |
| 4 | Lens 2 | 17.925500 (ASP) | 0.261 | Plastic | 1.634 | 23.8 | −4.71 |
| 5 | | 2.544620 (ASP) | 0.226 | | | | |
| 6 | Stop23 | Plano | 0.261 | | | | |
| 7 | Lens 3 | −6.553600 (ASP) | 0.317 | Plastic | 1.634 | 23.8 | −56.55 |
| 8 | | −8.170100 (ASP) | −0.094 | | | | |
| 9 | Stop34 | Plano | 0.449 | | | | |
| 10 | Lens 4 | −2.467740 (ASP) | 0.657 | Plastic | 1.544 | 55.9 | 2.09 |
| 11 | | −0.851900 (ASP) | −0.425 | | | | |
| 12 | Stop45 | Plano | 0.749 | | | | |
| 13 | Lens 5 | −3.372900 (ASP) | 0.280 | Plastic | 1.544 | 55.9 | −1.92 |
| 14 | | 1.561570 (ASP) | 0.500 | | | | |
| 15 | IR-filter | Plano | 0.300 | Glass | 1.517 | 64.2 | — |
| 16 | | Plano | 0.586 | | | | |
| 17 | Image | Plano | — | | | | |

\* Reference wavelength is 587.6 nm (d-line)
an effective radius of the stop 01 (YF) at surface 1 is 0.856 mm
an effective radius of the stop 23 (YF) at surface 6 is 0.890 mm
an effective radius of the stop 34 (YR) at surface 9 is 1.275 mm
an effective radius of the stop 45 (YR) at surface 12 is 1.850 mm

TABLE 28

Aspheric Coefficients

| Surface # | 2 | 3 | 4 | 5 | 7 |
|---|---|---|---|---|---|
| k = | −5.94912E+00 | 9.00000E+01 | 7.12118E+01 | 4.48426E+00 | −4.78291E+01 |
| A4 = | 2.24598E−01 | −2.31710E−02 | −5.82451E−03 | −1.28013E−02 | −2.00349E−01 |
| A6 = | −1.75034E−01 | 5.00413E−02 | 3.07208E−02 | 5.07716E−02 | −1.46295E−01 |
| A8 = | 1.29145E−01 | −1.89335E−01 | 1.86457E−01 | 1.30319E−01 | 2.58954E−01 |
| A10 = | −2.56790E−02 | 2.46953E−01 | −6.83428E−01 | −3.71927E−01 | −1.83764E−01 |
| A12 = | −5.33633E−02 | −3.59568E−01 | 6.80366E−01 | 3.11506E−01 | 5.77426E−02 |
| A14 = | 5.77347E−03 | 1.99807E−01 | −2.00362E−01 | −3.32735E−03 | |

| Surface # | 8 | 10 | 11 | 13 | 14 |
|---|---|---|---|---|---|
| k = | 5.00000E+01 | 2.01179E+00 | −3.04635E+00 | −4.38728E+01 | −1.28054E+01 |
| A4 = | −1.17246E−01 | −2.27270E−02 | −1.02892E−01 | −3.09564E−03 | −5.28365E−02 |
| A6 = | −9.11992E−02 | 9.23563E−02 | 1.15435E−01 | −2.13157E−02 | 1.27531E−02 |
| A8 = | 1.33925E−01 | −1.71428E−01 | −8.69510E−02 | 8.24732E−03 | −4.09172E−03 |
| A10 = | −4.10641E−02 | 1.97411E−01 | 4.34388E−02 | −5.89019E−04 | 9.51346E−04 |
| A12 = | 1.52543E−02 | −9.54207E−02 | −9.82896E−03 | −1.18677E−04 | −1.30875E−04 |
| A14 = | | 1.73535E−02 | 6.09132E−04 | 1.53546E−05 | 8.33593E−06 |

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 29.

TABLE 29

(Embodiment 10)

| f | 4.20 | YF/ImgH | Stop 01 | 0.30 |
|---|---|---|---|---|
| Fno | 2.45 | | Stop 12 | — |
| HFOV | 34.0 | | Stop 23 | 0.30 |
| V1 − V2 − V3 | 8.3 | YR/ImgH | Stop 34 | 0.43 |
| T12/T23 | 0.14 | | Stop 45 | 0.62 |
| (R3 + R4)/(R3 − R4) | 1.33 | DR/ImgH | Stop 34 | 0.60 |
| (R7 + R8)/(R7 − R8) | 2.05 | | Stop 45 | 0.84 |
| f5/f1 | −0.72 | YR/DR | Stop 34 | 0.71 |
| f/f3 | −0.07 | | Stop 45 | 0.73 |
| (f/f4) − (f/f5) | 4.19 | TTL/ImgH | | 1.65 |

Embodiment 11

Figure 11A:
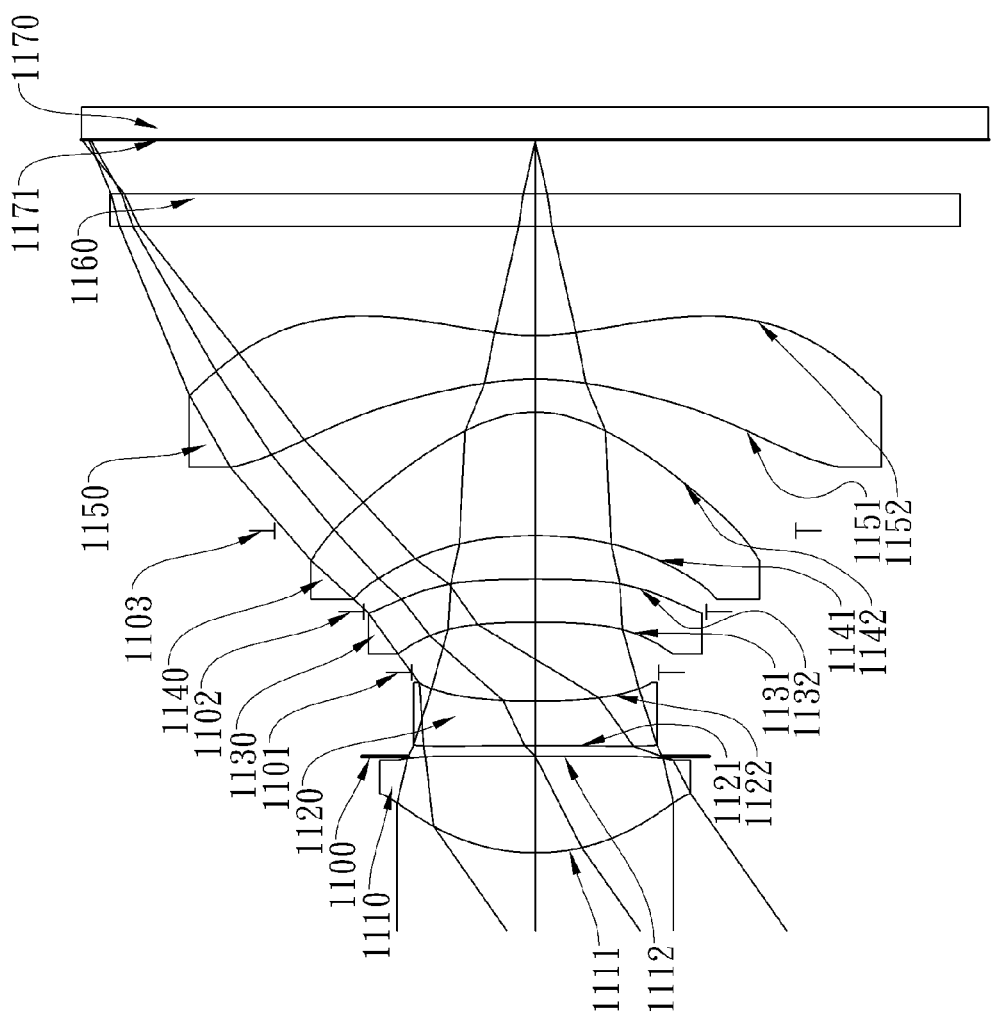
FIG. 11A shows an optical image capturing lens system in accordance with an eleventh embodiment of the present invention.
Figure 11B:
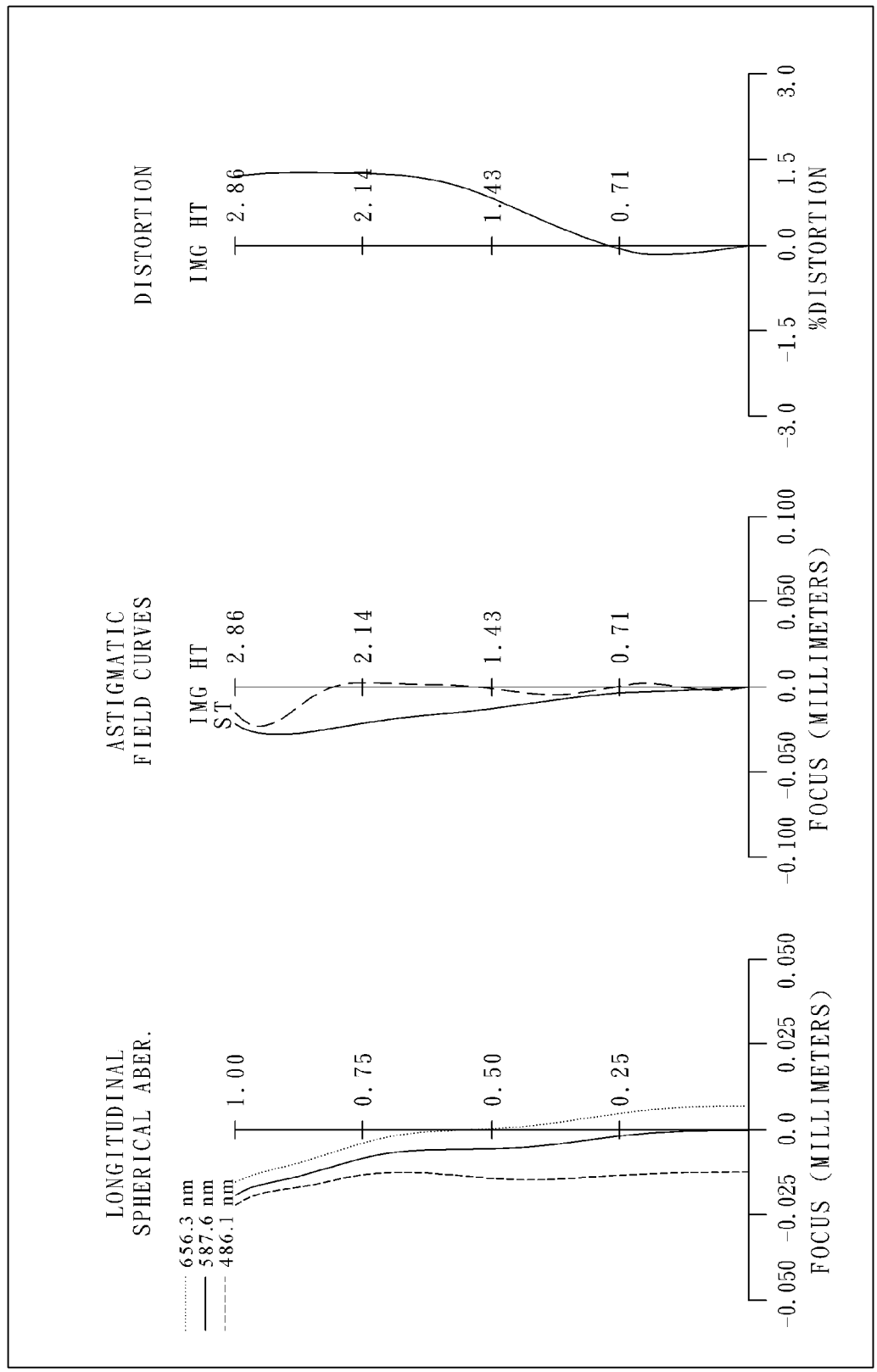
FIG. 11B shows the aberration curves of the eleventh embodiment of the present invention.

FIG. 11A shows an optical image capturing lens system in accordance with the eleventh embodiment of the present invention, and FIG. 11B shows the aberration curves of the eleventh embodiment of the present invention. The optical image capturing lens system of the eleventh embodiment of the present invention mainly comprises five lens elements, in order from an object side to an image side:

a first lens element 1110 made of plastic with positive refractive power having a convex object-side surface 1111 and a concave image-side surface 1112, the object-side and image-side surfaces 1111 and 1112 thereof being aspheric;

a second lens element 1120 made of plastic with negative refractive power having a concave object-side surface 1121 and a concave image-side surface 1122, the object-side and image-side surfaces 1121 and 1122 thereof being aspheric;

a third lens element 1130 made of plastic with negative refractive power having a concave object-side surface 1131 and a convex image-side surface 1132, the object-side and image-side surfaces 1131 and 1132 thereof being aspheric;

a fourth lens element 1140 made of plastic with positive refractive power having a concave object-side surface 1141 and a convex image-side surface 1142, the object-side and image-side surfaces 1141 and 1142 thereof being aspheric; and a fifth lens element 1150 made of plastic with negative refractive power having a concave object-side surface 1151 and a concave image-side surface 1152, the object-side and image-side surfaces 1151 and 1152 thereof being aspheric, and at least one inflection point is formed on both the object-side surface 1151 and the image-side surface 1152 thereof;

wherein the optical image capturing lens system also comprises two front stops 1100 (stop 12), 1101 (stop 23), which are positioned between the first lens element 1110 and the second lens element 1120, and the second lens element 1120 and the third lens element 1130; wherein the front stop 1100 (stop 12) is an aperture stop;

wherein the optical image capturing lens system also comprises two rear stops 1102 (stop 34), 1103 (stop 45), which are positioned between the third lens element 1130 and the fourth lens element 1140, and the fourth lens element 1140 and the fifth lens element 1150;

the optical image capturing lens system further comprises an IR filter 1160 disposed between the image-side surface 1152 of the fifth lens element 1150 and an image plane 1171, and the IR filter 1160 is made of glass and has no influence on the focal length of the optical image capturing lens system; the optical image capturing lens system further comprises an image sensor 1170 provided on the image plane 1171.

The detailed optical data of the eleventh embodiment is shown in TABLE 30, and the aspheric surface data is shown in TABLE .31, wherein the units of the radius of curvature, the thickness and the focal length are expressed in mm, and HFOV is half of the maximal field of view.

TABLE 30

(Embodiment 11)
f = 4.04 mm, Fno = 2.25, HFOV = 35.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.327490 (ASP) | 0.621 | Plastic | 1.544 | 55.9 | 2.54 |
| 2 | | 29.195500 (ASP) | −0.001 | | | | |
| 3 | Stop12 (Ape. Stop) | Plano | 0.070 | | | | |
| 4 | Lens 2 | −19.210800 (ASP) | 0.285 | Plastic | 1.640 | 23.3 | −5.25 |
| 5 | | 4.097400 (ASP) | 0.185 | | | | |
| 6 | Stop23 | Plano | 0.323 | | | | |
| 7 | Lens 3 | −6.830200 (ASP) | 0.277 | Plastic | 1.634 | 23.8 | −28.36 |
| 8 | | −11.188400 (ASP) | −0.210 | | | | |
| 9 | Stop34 | Plano | 0.489 | | | | |
| 10 | Lens 4 | −2.675550 (ASP) | 0.796 | Plastic | 1.544 | 55.9 | 1.62 |
| 11 | | −0.732980 (ASP) | −0.765 | | | | |
| 12 | Stop45 | Plano | 0.976 | | | | |
| 13 | Lens 5 | −1.789770 (ASP) | 0.280 | Plastic | 1.535 | 56.3 | −1.48 |
| 14 | | 1.496570 (ASP) | 0.700 | | | | |
| 15 | IR-filter | Plano | 0.210 | Glass | 1.517 | 64.2 | — |
| 16 | | Plano | 0.348 | | | | |
| 17 | Image | Plano | — | | | | |

* Reference wavelength is 587.6 nm (d-line)
an effective radius of the stop 12 (YF) at surface 3 is 0.815 mm
an effective radius of the stop 23 (YF) at surface 6 is 0.795 mm
an effective radius of the stop 34 (YR) at surface 9 is 1.100 mm
an effective radius of the stop 45 (YR) at surface 12 is 1.675 mm

TABLE 31

Aspheric Coefficients

| Surface # | 1 | 2 | 4 | 5 | 7 |
|---|---|---|---|---|---|
| k = | −4.75808E+00 | 9.00000E+01 | 9.00000E+01 | 1.86702E+01 | 3.09776E+00 |
| A4 = | 2.50361E−01 | −6.00547E−02 | −3.91269E−03 | 3.98079E−02 | −2.20484E−01 |
| A6 = | −1.82248E−01 | 4.09500E−02 | 6.82929E−02 | 6.18629E−02 | −1.88174E−01 |
| A8 = | 1.83046E−01 | −2.70433E−03 | 2.50409E−01 | 2.55389E−01 | 4.71614E−01 |
| A10 = | −1.67320E−01 | −8.78150E−02 | −7.88943E−01 | −7.80353E−01 | −6.03190E−01 |
| A12 = | 1.28441E−01 | −9.44558E−03 | 9.37709E−01 | 1.11077E+00 | 3.38448E−01 |
| A14 = | −1.02866E−01 | 3.87203E−02 | −3.74415E−01 | −3.87561E−01 | |

| Surface # | 8 | 10 | 11 | 13 | 14 |
|---|---|---|---|---|---|
| k = | 9.00000E+01 | 2.47057E+00 | −3.29279E+00 | −1.45368E+01 | −1.82726E+01 |
| A4 = | −2.01590E−01 | −1.37556E−01 | −1.58646E−01 | −2.04697E−03 | −5.82042E−02 |
| A6 = | −1.63384E−02 | 1.44910E−01 | 1.42412E−01 | −2.53166E−02 | 1.43146E−02 |
| A8 = | 1.05237E−01 | −1.77657E−01 | −1.01504E−01 | 9.69243E−03 | −5.03165E−03 |
| A10 = | −1.87915E−02 | 2.39863E−01 | 5.38791E−02 | −6.78110E−04 | 1.21604E−03 |
| A12 = | −5.30520E−04 | −1.46287E−01 | −1.57887E−02 | −1.37559E−04 | −1.77020E−04 |
| A14 = | | 2.54477E−02 | 1.24102E−03 | 1.72861E−05 | 1.17686E−05 |

The equation of the aspheric surface profiles of the eleventh embodiment has the same form as that of the first embodiment. Moreover, the description of the factors in the relations is as those set forth in the first embodiment, but the values of the relations of the eleventh embodiment are listed in the following TABLE 32.

TABLE 32

(Embodiment 11)

| f | 4.04 | YF/ImgH | | Stop 01 | — |
|---|---|---|---|---|---|
| Fno | 2.25 | | | Stop 12 | 0.29 |
| HFOV | 35.0 | | | Stop 23 | 0.28 |
| V1 − V2 − V3 | 8.8 | YR/ImgH | | Stop 34 | 0.38 |
| T12/T23 | 0.14 | | | Stop 45 | 0.56 |
| (R3 + R4)/(R3 − R4) | 0.65 | DR/ImgH | | Stop 34 | 0.54 |
| (R7 + R8)/(R7 − R8) | 1.75 | | | Stop 45 | 0.72 |
| f5/f1 | −0.58 | YR/DR | | Stop 34 | 0.70 |
| f/f3 | −0.14 | | | Stop 45 | 0.78 |
| (f/f4) − (f/f5) | 5.22 | TTL/ImgH | | | 1.58 |

It is to be noted that TABLES 1-32 show different data of the different embodiments, however, the data of the different embodiments are obtained from experiments. Therefore, any optical image capturing lens system of the same structure is considered to be within the scope of the present invention even if it uses different data. The embodiments depicted above and the appended drawings are exemplary and are not intended to limit the scope of the present invention.

What is claimed is:

1. An optical image capturing lens system comprising, in order from an object side to an image side:

a first lens element with positive refractive power having a convex object-side surface;

a second lens element;

a third lens element;

a fourth lens element; and a fifth lens element with negative refractive power, at least one of the object-side and image-side surfaces thereof being aspheric, and at least one inflection point is formed on at least one of the object-side and image-side surfaces thereof;

wherein the optical image capturing lens system at least has one front stop and one rear stop; the front stop is positioned between an imaged object and the third lens element; the rear stop is positioned between the third lens element and the fifth lens element;

wherein an effective radius of the front stop is YF, a maximum image height on an image plane of the system is ImgH, an effective radius of the rear stop is YR, an axial distance between the object-side surface of the first lens element and the rear stop is DR, and they satisfy the following relations:

$0.1 < YF/\text{Img}H < 0.5$;

$0.2 < YR/\text{Img}H < 0.8$; and $0.4 < DR/\text{Img}H < 1.2$.

2. The optical image capturing lens system according to claim 1, wherein the fourth lens element has positive refractive power and at least one of the object-side and image-side surfaces is aspheric; and the fifth lens element has a concave image-side surface.

3. The optical image capturing lens system according to claim 2, wherein the second lens element has negative refractive power, and the front stop is an aperture stop.

4. The optical image capturing lens system according to claim 3, wherein the second lens element has a concave image-side surface, and the fourth lens element has a concave object-side surface and a convex image-side surface.

5. The optical image capturing lens system according to claim 4, wherein a focal length of the fifth lens element is f5, a focal length of the first lens element is f1, and they satisfy the following relation:

$-0.9 < f5/f1 < -0.3$.

6. The optical image capturing lens system according to claim 5, wherein the fifth lens element has a concave object-side surface, a focal length of the optical image capturing lens system is f, a focal length of the third lens element is f3, and they satisfy the following relation:

$-0.5 < f/f3 < 0.3$.

7. The optical image capturing lens system according to claim 5, comprising at least four stops.

8. The optical image capturing lens system according to claim 3, wherein the third lens element has negative refractive power, at least one of the object-side and image-side surfaces thereof is aspheric, and the third lens element is made of plastic; the aperture stop is positioned between the first lens element and the second lens element.

9. The optical image capturing lens system according to claim 8, wherein a focal length of the optical image capturing lens system is f, a focal length of the fourth lens element is f4, a focal length of the fifth lens element is f5, and they satisfy the following relation:

$3.8<(f/f4)-(f/f5)<6.0$.

10. The optical image capturing lens system according to claim 8, wherein the first lens element, the second lens element, the third lens element, the fourth lens element and the fifth lens element are made of plastic, and the object-side and image-side surfaces of the first lens element, the second lens element, the third lens element, the fourth lens element and the fifth lens element are aspheric; an Abbe number of the first lens element is V1, an Abbe number of the second lens element is V2, an Abbe number of the third lens element is V3, and they satisfy the following relation:

$0<V1-V2-V3<20$.

11. The optical image capturing lens system according to claim 3, wherein an axial distance between the object-side surface of the first lens element and the image plane is TTL, the maximum image height on the image plane of the system is ImgH, and they satisfy the following relation:

$TTL/ImgH<2.0$.

12. An optical image capturing lens system comprising, in order from an object side to an image side:
   a first lens element with positive refractive power having a convex object-side surface;
   a second lens element with negative refractive power;
   a third lens element;
   a fourth lens element with positive refractive power having a concave object-side surface and a convex image-side surface, at least one of the object-side and the image-side surfaces being aspheric; and
   a fifth lens element with negative refractive power having a concave image-side surface, at least one of the object-side and image-side surfaces thereof being aspheric, and at least one inflection point is formed on at least one of the object-side and image-side surfaces thereof;
   wherein the optical image capturing lens system at least has one front stop and one rear stop; the front stop is positioned between an imaged object and the third lens element; the rear stop is positioned between the third lens element and the fifth lens element;
   wherein an effective radius of the rear stop is YR, an axial distance between the object-side surface of the first lens element and the rear stop is DR, and they satisfy the following relation:

$0.4<YR/DR<1.0$.

13. The optical image capturing lens system according to claim 12, wherein an effective radius of the front stop is YF; a maximum image height on an image plane of the system is ImgH, an effective radius of the rear stop is YR, and they satisfy the following relations:

$0.1<YF/ImgH<0.5$; and $0.2<YR/ImgH<0.8$.

14. The optical image capturing lens system according to claim 13, wherein the fifth lens element has a concave object-side surface.

15. The optical image capturing lens system according to claim 13, wherein a curvature radius of the object-side surface of the fourth lens element is R7, a curvature radius of the image-side surface of the fourth lens element is R8, and they satisfy the following relation:

$1.2<(R7+R8)/(R7-R8)<2.5$.

16. The optical image capturing lens system according to claim 13, wherein an axial distance between the first lens element and the second lens element is T12, an axial distance between the second lens element and the third lens element is T23, and they satisfy the following relation:

$0.02<T12/T23<0.3$.

17. The optical image capturing lens system according to claim 13, wherein a focal length of the optical image capturing lens system is f, a focal length of the fourth lens element is f4, a focal length of the fifth lens element is f5, and they satisfy the following relation:

$3.8<(f/f4)-(f/f5)<6.0$.

18. The optical image capturing lens system according to claim 13, wherein a curvature radius of the object-side surface of the second lens element is R3, a curvature radius of the image-side surface of the second lens element is R4, and they satisfy the following relation:

$-0.5<(R3+R4)/(R3-R4)<1.8$.

19. The optical image capturing lens system according to claim 13, wherein the second lens element has a concave object-side surface and a concave image-side surface.

20. The optical image capturing lens system according to claim 13, wherein an axial distance between the object-side surface of the first lens element and the image plane is TTL, the maximum image height on the image plane of the system is ImgH, and they satisfy the following relation:

$TTL/ImgH<2.0$.

* * * * *